United States Patent
Green et al.

(10) Patent No.: US 12,491,689 B2
(45) Date of Patent: Dec. 9, 2025

(54) LAY-UP FORMING DEVICE AND ASSOCIATED COMPONENTS AND METHODS

(71) Applicant: Northrop Grumman Systems Corporation, Falls Church, VA (US)

(72) Inventors: Keri M. Green, Holladay, UT (US); Timothy S. Olschewski, Kearns, UT (US); Vernon M. Benson, Morgan, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 80 days.

(21) Appl. No.: 18/457,097

(22) Filed: Aug. 28, 2023

(65) Prior Publication Data

US 2025/0074014 A1    Mar. 6, 2025

(51) Int. Cl.
B29C 70/34    (2006.01)
B29C 70/38    (2006.01)

(52) U.S. Cl.
CPC ............ B29C 70/34 (2013.01); B29C 70/388 (2013.01)

(58) Field of Classification Search
CPC ........................... B29C 70/504; B29C 70/388
See application file for complete search history.

(56) References Cited

U.S. PATENT DOCUMENTS

| | | | |
|---|---|---|---|
| 5,182,060 A * | 1/1993 | Berecz | B29C 48/05 156/289 |
| 2007/0044922 A1* | 3/2007 | Mischler | B29C 70/382 156/577 |
| 2008/0000576 A1* | 1/2008 | Miller | B29C 70/382 156/166 |
| 2010/0024971 A1* | 2/2010 | Benson | B29C 70/30 156/443 |
| 2011/0011537 A1* | 1/2011 | Hamlyn | B29C 70/384 156/436 |
| 2011/0104432 A1* | 5/2011 | Duqueine | B29D 99/0003 428/113 |
| 2011/0247751 A1 | 10/2011 | Steyer et al. | |
| 2013/0221568 A1* | 8/2013 | Shindo | B29C 43/222 264/258 |
| 2014/0102625 A1* | 4/2014 | De Mattia | B32B 5/26 156/437 |
| 2019/0224927 A1* | 7/2019 | Ross | B29C 70/382 |

FOREIGN PATENT DOCUMENTS

FR    2996801 A1    4/2014

OTHER PUBLICATIONS

International Search Report for International Application No. PCT/US24/39352, mailed Oct. 22, 2024, 3 pages.
International Written Opinion for International Application No. PCT/US24/39352, mailed Oct. 22, 2024, 5 pages.

* cited by examiner

*Primary Examiner* — Andrew D Graham
(74) *Attorney, Agent, or Firm* — TraskBritt

(57) ABSTRACT

A lay-up forming element includes an inner region including a fluid port. The element further includes a flexible outer surface. The element also includes a support extending between the inner region and the flexible outer surface. The roller further includes a fluid cavity extending between the inner region and the flexible outer surface. The fluid cavity is in fluid communication with the fluid port. A lay-up forming device and a method of forming a composite structure are also disclosed.

19 Claims, 16 Drawing Sheets

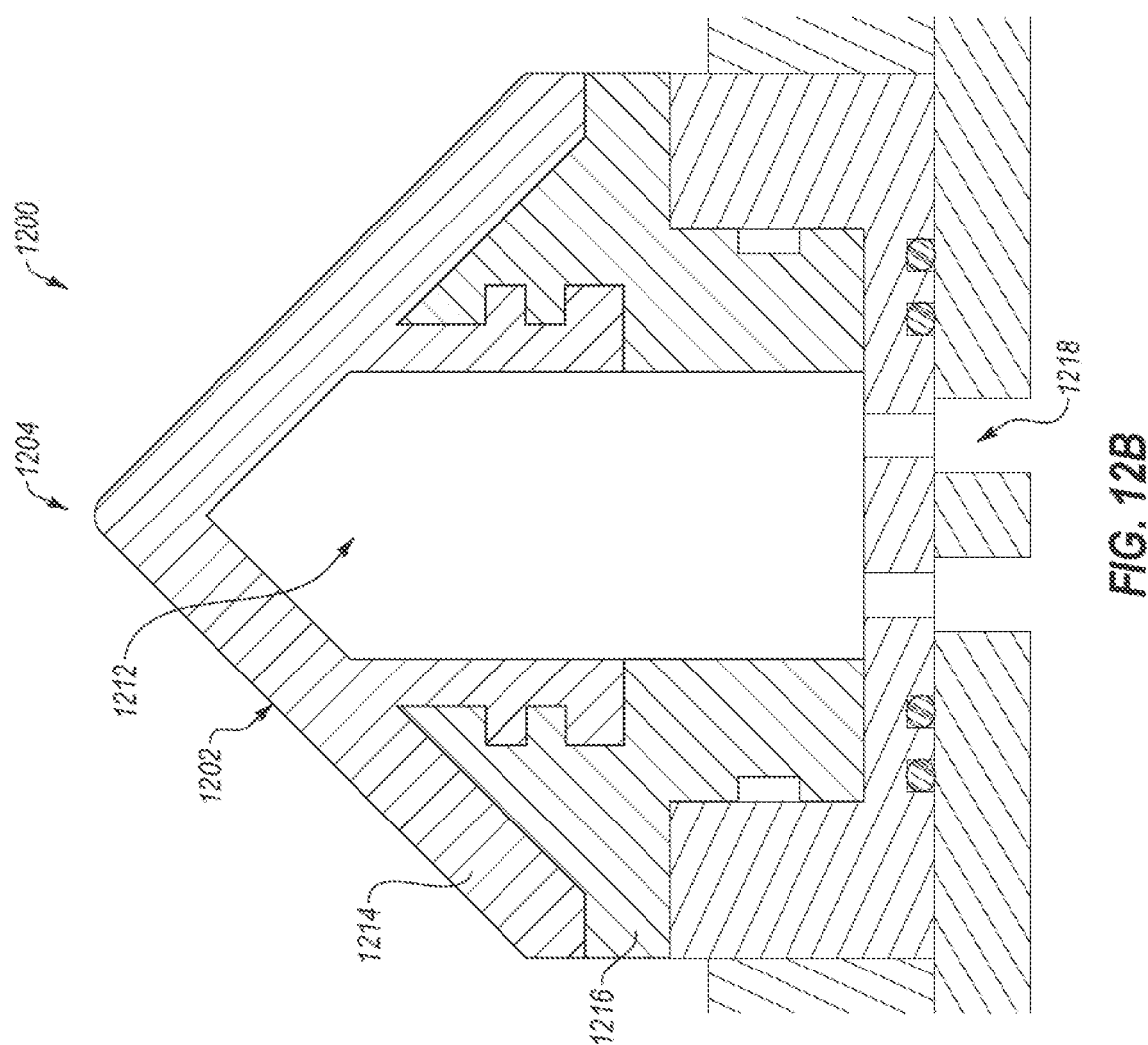

LAY-UP FORMING DEVICE AND ASSOCIATED COMPONENTS AND METHODS

TECHNICAL FIELD

Embodiments of the present disclosure generally relate to lay-up forming tooling. In particular, embodiments of the present disclosure relate to lay-up forming tooling, lay-up forming tools and associated components and methods.

BACKGROUND

Lay-up forming processes are used to form components from layers of materials that are stacked over one another to build up a greater thickness of a material wall for the associated component. For example, composite forming processes may including a lay-up forming process, where layers of composite sheets, such as fiberglass sheets, fiberglass mats, carbon fiber sheets, or carbon fiber pre-preg sheets are stacked to build up a desired thickness of the associated composite component. These processes may be used to form vehicle structures, such as body panels, fuselage, sub-frames, wings, flaps, etc., tank structures, such as tank walls, support structures, etc., general support structures, such as support struts, walls, etc., and other composite structures.

BRIEF SUMMARY

Embodiments of the disclosure include a lay-up forming device. The device includes a body and a roller assembly coupled to the body. The roller assembly includes one or more conformable rollers. The one or more conformable rollers include an axle and a flexible outer surface. The rollers further include at least one support extending between the axle and the flexible outer surface. The roller also includes at least one fluid cavity extending between the axle and the flexible outer surface.

Another embodiment of the disclosure includes a lay-up forming element. The element includes an inner region including a fluid port. The element further includes a flexible outer wall. The element also includes a support extending between the inner region and the flexible outer wall. The element further includes a fluid cavity extending between the inner region and the flexible outer wall, the fluid cavity in fluid communication with the fluid port of the inner region.

Another embodiment of the disclosure includes a method of forming a composite structure. The method includes applying a first sheet of material over a mold. The method further includes applying a first compressing force to the first sheet of material through a forming element including a support portion and a flexible portion. The method also includes achieving pressure by applying a fluid pressure internally to the flexible portion of the forming element. The method further includes applying a second sheet of material over the first sheet of material. The method also includes applying a second compressing force to the second sheet of material through the forming element. The method further includes conforming a shape of the flexible portion of the forming element to changing geometry created by added sheets of material on a radius feature of the mold.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

FIG. 12B illustrates an enlarged cross-sectional view of an embodiment of the flexible slider of FIG. 12A;

DETAILED DESCRIPTION

Figure 1A:
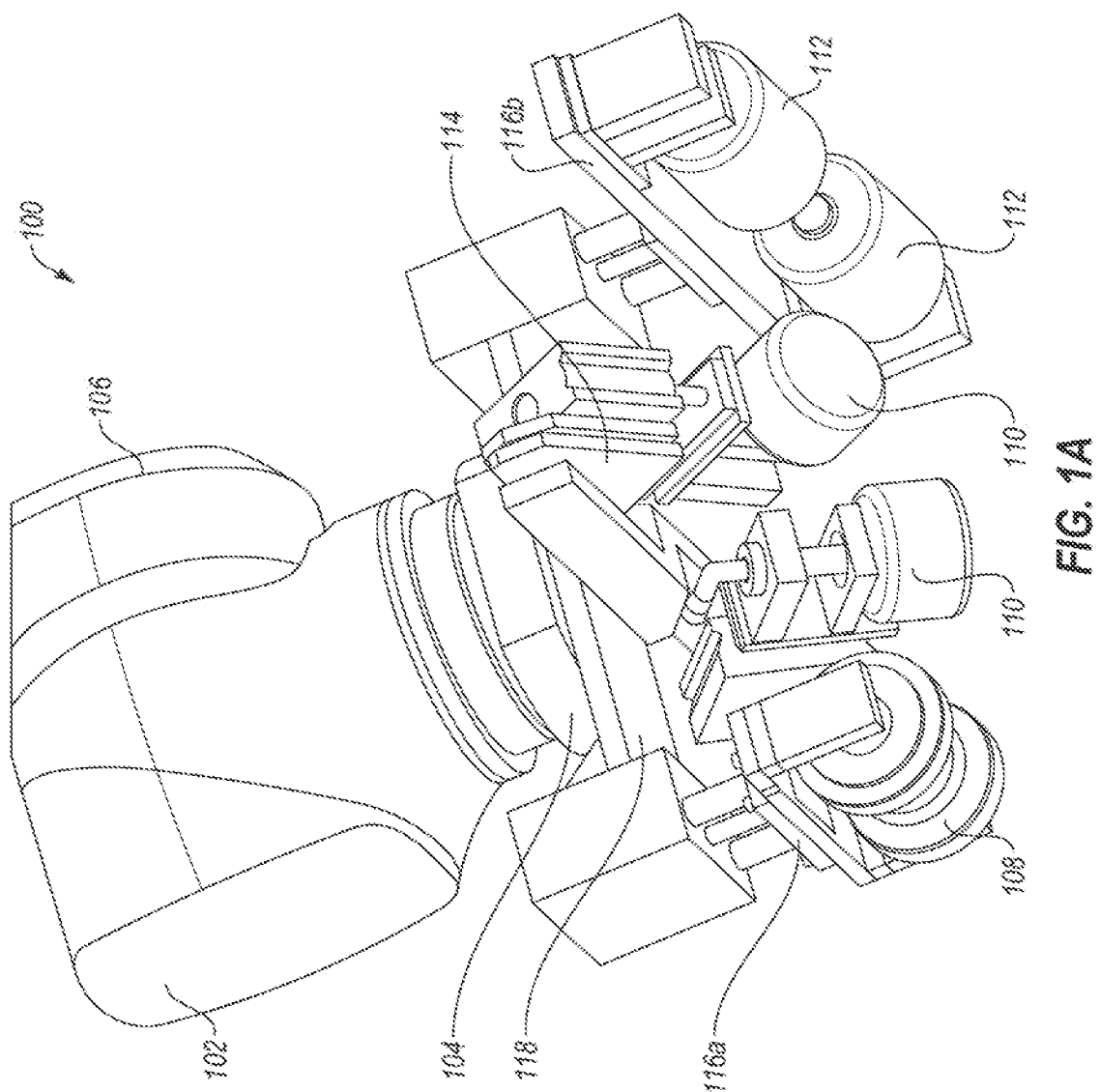
FIGS. 1A and 1B illustrate a perspective views of a forming device in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "lead," "leading," "trailing," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "composite material" or "composite materials" mean and include non-homogeneous materials including at least a material formed from multiple fibers, such as glass fibers, carbon fibers, polymer fibers, ceramic fibers, fibers of biological material (e.g., hemp, flax, etc.), metal fibers, etc., and a binding agent, such as a polymer matrix (e.g., an epoxy resin, bismaleimide resin, thermoplastic, polyimide, phenolic material, etc.), a preceramic matrix, a ceramic matrix, etc. In some embodiments, the composite material includes sheets of material including both the material formed from multiple fibers and the binding agent. In other embodiments, the composite material includes sheets of "dry fiber" where the sheet only includes the material formed from the multiple fibers and the binding agent is applied later in the process. In other embodiments, the composite material includes sheets of "dry fiber" where the sheet includes the material formed form the multiple fibers with a portion of the binder or other binding means and the bulk of the binding agent is applied later in the process. In some embodiments, the material formed from multiple fibers includes continuous fibers (e.g., long uninterrupted fibers extending the length of the material sheets). In other embodiments the material formed from the multiple fibers includes discontinuous fibers (e.g., short interrupted portions of the fiber that when joined by the binding agent act as long continuous fibers). In some embodiments, the material formed from the multiple fibers has a woven or braided form, where the fibers are not maintained in a same plane of the material. In other embodiments, the material formed from the multiple fibers has a ply form, where the layers of fiber are maintained in a same plane and do not pass around fibers in an adjoining plane.

Lay-up forming processes are used to form components from layers of materials that are stacked over one another to build up a desired thickness of a material for the different areas of an associated component. When forming complex shapes a first layer of material may be applied over a mold that may include angled corners, radiused corners, recesses, protrusions etc., configured to create the complex shapes in the resulting component, by defining corresponding angled corners, radiused corners, recesses, protrusions, etc., in the layers of material. As additional layers of material are added, the shapes of the corresponding radii may change incrementally as the thickness of the material between the mold and a top layer increases. For example, female radii will decrease as additional layers are added and male radii will increase as additional layers are added. The conventional process for accommodating these incremental changes in shape is to change the tooling after forming a couple of layers to accommodate the change in shape. This process results in additional time to change out the tooling after every two to three layers as well as additional tooling costs associated with using multiple different devices to accommodate the incremental changes in shape. A forming device capable of absorbing the incremental changes in shape may result in a reduction in both tooling costs and time to form the associated components (e.g., composite parts).

Figure 1B:
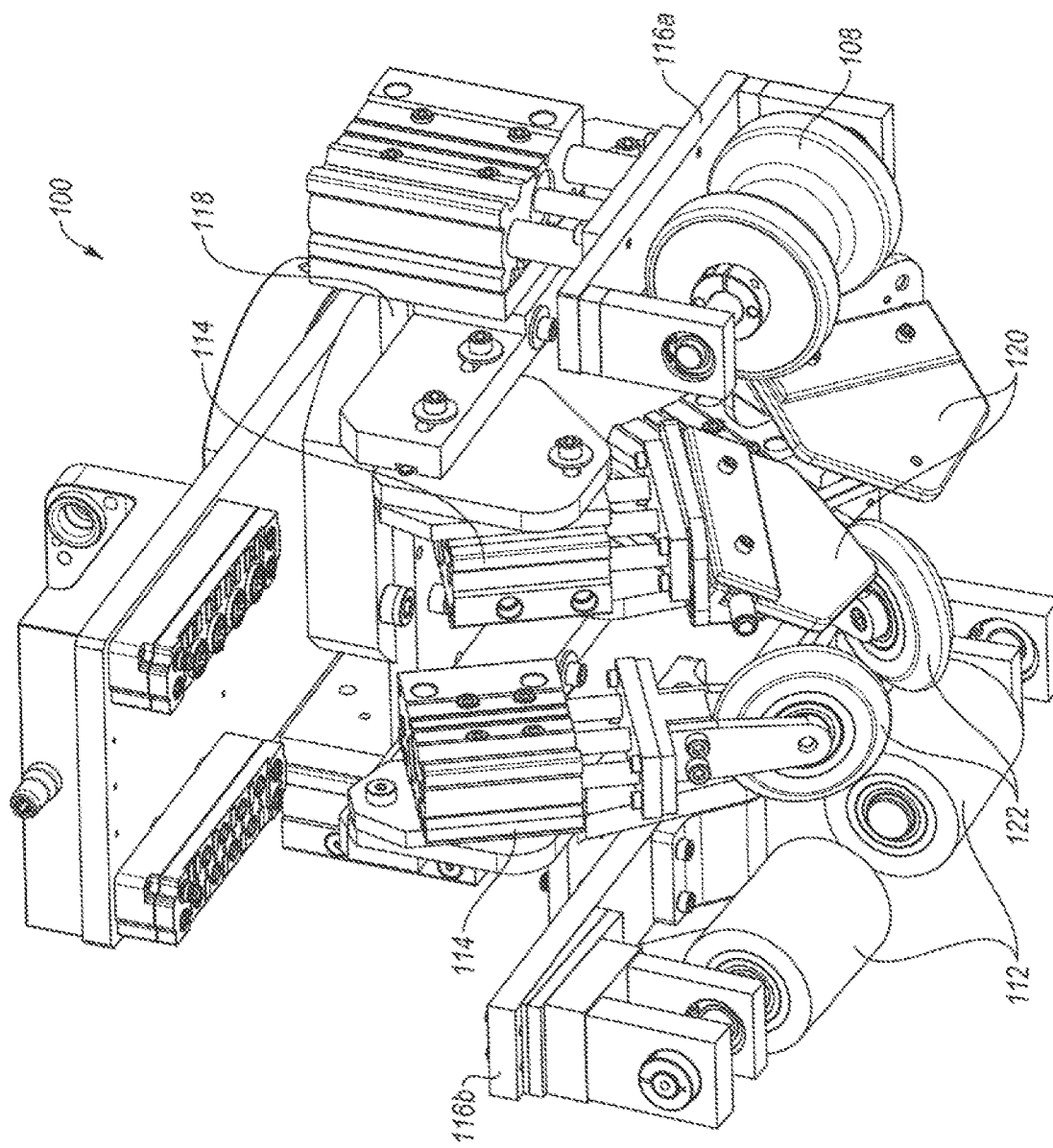
Figure 2:
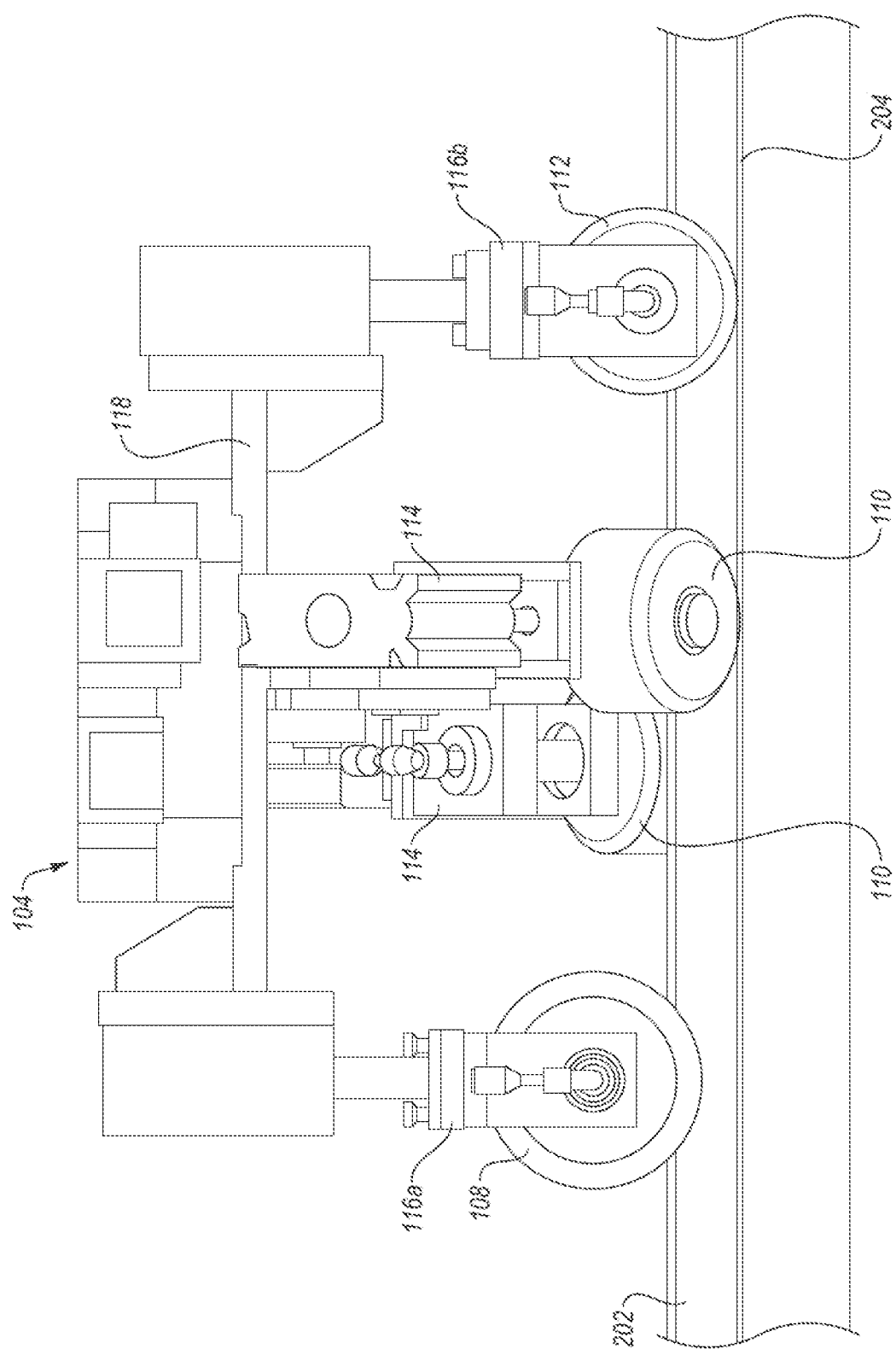
FIG. 2 illustrates a plan view of the forming device of FIG. 1.

FIGS. 1A-2 illustrate different views of a lay-up forming device 100. The device 100 may include a positioning control body 102 and a base 104. FIG. 1A illustrates a perspective view of the lay-up forming device 100 including both the body 102 and the base 104. FIG. 1B illustrates the lay-up forming device 100 in another configuration. FIG. 2 illustrates a side view of the base 104 of the device 100 engaged with a sheet of material (not shown) over a mold 202, such as a mold 202 having a stiffener profile as illustrated in the embodiment of FIG. 2.

The body 102 may include multiple motors or drives configured to position the base 104 relative to the body 102. The body 102 may also include a coupler 106 configured to attach the body 102 to another component, such as a robotic arm or another machine or tooling. In some embodiments, the body 102 may include handles for manually positioning the device 100. The body 102 may include additional sensors and other electronics, such as controllers, transmitters, receivers, pumps, heaters, etc. The body 102 may be encased by an outer shell substantially surrounding the motors, drives, sensors, and other electronics. The outer shell of the body 102 may be configured to protect the enclosed electronic components from damage, such as impact damage, contamination damage, etc. The outer shell of the body 102 may also be configured to substantially prevent debris from the enclosed components from falling out of the body 102 onto the working surface. In some embodiments, the outer shell of the body 102 is also electrically insulative, such as to protect sensitive electronic components encased therein or to prevent electrical discharges outside of the body 102.

The base 104 may include interface tooling for interfacing with an associated structure. The base 104 may be configured to be mechanically exchanged, such that the device 100 may be changed to match an associated structure. In other embodiments, the base 104 may be configurable, such that a configuration of the tooling attached to the base 104 may be changed to match an associated structure. For example, the device 100 illustrated in FIGS. 1A and 1B is configured to interface with a stiffener profile mold 202, as illustrated in FIG. 2.

The base 104 may include a platform 118. One or more appendages 116a, 116b and 114 may extend from the platform 118. The appendages 116a, 116b and 114 may support a roller assembly including rollers 108, 110, 112 that may interface with the associated structure. The rollers 108, 110, 112 may be configured to apply compressing forces onto layers of the associated structure after each layer is applied. The compressing forces may cause the layers to conform to an underlying shape of an already formed structure, such as a mold or previous layers of the associated structure. Different rollers 108, 110, 112 may have different shapes corresponding to different profile shapes of the associated structure. For example, in the embodiment illustrated in FIG. 1, a lead roller 108 has a concave profile configured to conform the sheet of material to a top surface of a stiffener profile mold 202. The side rollers 110 have substantially flat profiles and a female radii compaction feature 124 and are positioned such that the side rollers 110 are substantially parallel with the side surfaces of the stiffener profile mold 202, such that the side rollers 110 are configured to conform the sheet of material to the side surfaces of the stiffener profile mold 202 and form/compact the material into the female radii on both sides of the mold 202. Flat rollers 112 with substantially flat profiles follow the side rollers 110. The flat rollers 112 are positioned to be substantially parallel with a plane of the flange surface 204 of the associated component or mold to conform the sheet of material to the surface of the component or mold on both sides of the stiffener profile mold 202. Each of the rollers 108, 110, 112 may be secured to one of the appendages 114, 116a, or 116b.

The arrangement of the rollers 108, 110, 112 may be configured to sequentially compact one or more surfaces of the stiffener profile and to substantially prevent discontinuities, such as wrinkles, bubbles, creases, etc., in the sheet by applying the initial compressive forces to a top of the stiffener profile mold 202 and progressively applying the compressive force to positions extending away from the top of the stiffener profile mold 202. In some embodiments, the base 104 is modular. For example, the platform 118 is configured to facilitate multiple different positions for the appendages 116a, 116b, and 114. Thus, the positions of the appendages 116a, 116b, and 114 may be adjusted for different features. Furthermore, the types of rollers 108, 110, 112 coupled to each of the appendages may be changed for different types of features.

FIG. 1B illustrates another configuration of the lay-up forming device 100. As discussed above, the platform 118 of the lay-up forming device 100 may be configured to facilitate coupling multiple different arrangements of appendages 114, 116a, and 116b. For example, the configuration of the lay-up forming device 100 illustrated in FIG. 1B includes two sets of intermediary appendages 114, a leading appendage 116a, and a trailing appendage 116b. Other configurations of the lay-up forming device 100 may include additional sets of intermediary appendages 114, leading appendages 116a, and/or trailing appendages 116b. Different configurations of the lay-up forming device 100 may incorporate different types of forming elements. For example, the configuration of the lay-up forming device 100 illustrated in FIG. 1B includes flexible sliders 120 coupled to one of the sets of appendages 114 and corner rollers 122 coupled to another set of appendages 114. The flexible sliders 120 and corner rollers 122 may be configured to interface with a flexible sheet of material in a similar manner to the rollers 108, 110, 112 described above with respect to FIG. 1A to conform the flexible sheet of material to an underlying structure.

As described above, the profile of the stiffener mold 202 will incrementally change as additional layers are applied to the component. In the case of the stiffener profile mold 202, the changes in profile may include a width of the upper cap (e.g., top surface of the stiffener profile), an increase in the male radius of the transition (e.g., corner or angle) between a top surface of the stiffener profile and the side surfaces, and a decrease in the female radius of the transition (e.g., corner or angle) between the side surfaces of the stiffener and the flange surface of the associated component.

Flexible or conformable rollers, such as rollers 300, 402, 500, 600, 700, 800, 900, 1000, and 1100, described below, may be used for one or more of the rollers 108, 110, and 112 of the device 100, or in combination with one or more of such rollers. As described in further detail below, flexible roller and conformable roller include rollers with a flexible material defining at least a portion of a forming surface of the roller. A flexible roller may also be conformable when at least a portion of the forming surface may move or adjust its flexibility or rigidity responsive to a change in another property, such as a fluid pressure. Flexible or conformable rollers may also include rigid material defining other non-flexible portions of the forming surface that help register and control accurate positioning of the roller while compacting the constant profile portions of the stiffener or component being fabricated.

Figure 3:
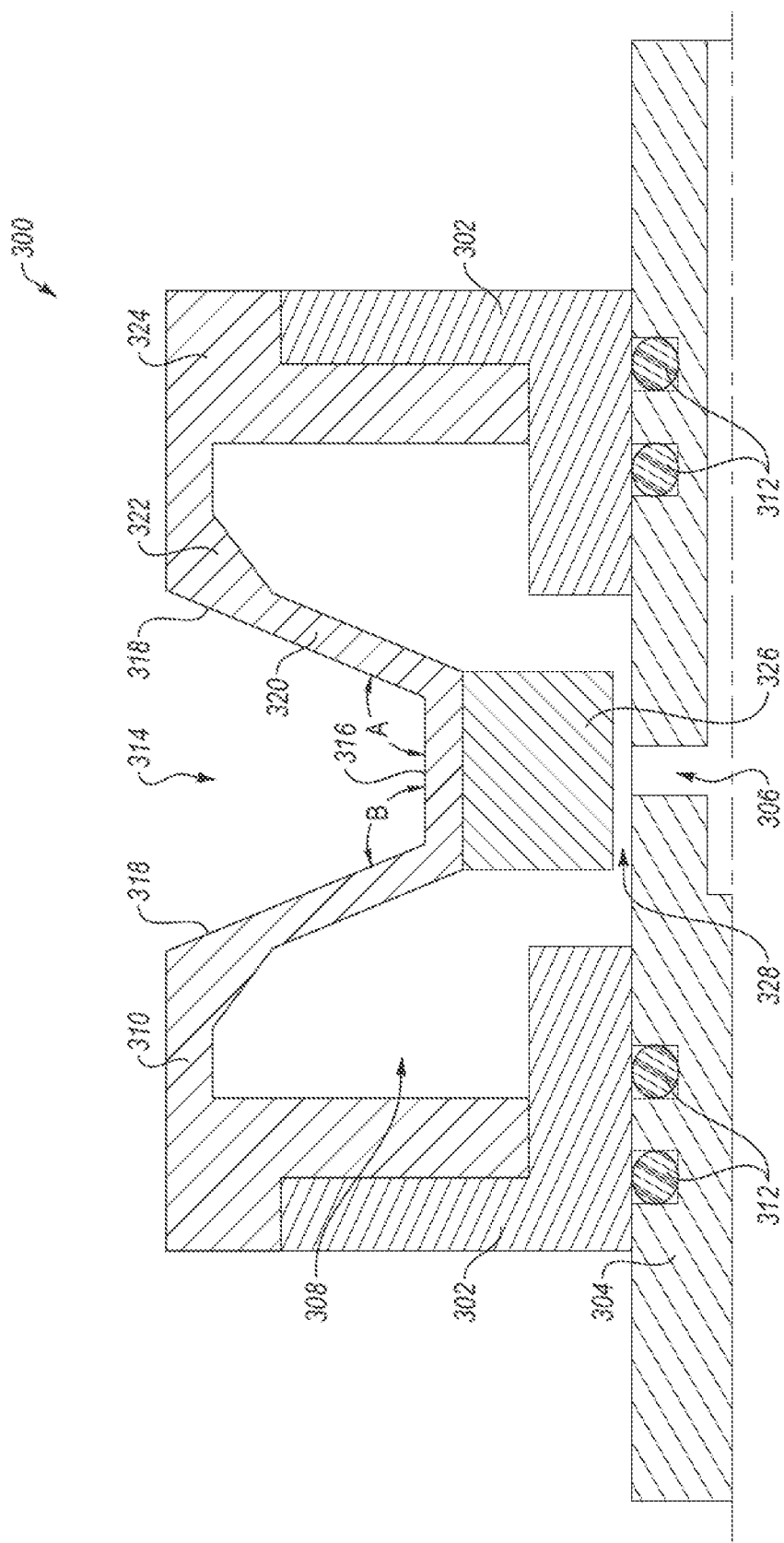
FIGS. 3-11 illustrate enlarged cross-sectional views of different embodiments of flexible rollers configured to be coupled to the forming device of FIG. 1.

FIG. 3 illustrates an enlarged sectional view of an embodiment of a conformable roller or a flexible roller 300, such as the lead roller 108 of FIGS. 1 and 2. The flexible roller 300 includes support structures 302 and 326 coupled to an axle 304. The support structures 302 may be coupled to the axle 304 through one or more seals 312, such as elastomeric O-rings, polytetrafluoroethylene (PTFE) seals, etc. A central support structure 326 may be coupled (e.g., bonded or clamped) to an outer wall 310, while maintaining a gap 328 between the axle 304 and the central support structure 326. The support structures 302, 326 may be formed from a rigid material, such as a metal material (e.g., aluminum, titanium, steel, or alloys thereof), or a rigid polymer (e.g., polytetrafluoroethylene, polyvinyl chloride, acrylonitrile butadiene styrene, etc.). The material of the support structures 302, 326 may be formed through conventional processes, such as machining, additive manufacturing, injection molding, among others to form the support structures 302 to a desired shape. An outer wall 310 may be formed from a flexible material, such as an elastomer, extending between the support structures 302. The flexible material of the outer wall 310 may include polymer materials (e.g., polyethylene or polypropylene) or rubber materials. The support structures 302 and the outer wall 310 may define a cavity 308. The cavity 308 may be filled with a fluid, such as a liquid (e.g., water, oil, etc.) or a gas (e.g., air, nitrogen, etc.). The material of the outer wall 310 may be configured to be impermeable to the associated fluid, such that the outer wall 310 may contain the fluid within the cavity 308 and the fluid may pressurize the cavity 308. The gap 328 may be configured to facilitate fluid flow between the axle 304 and the central support structure 326, such as to balance pressure in the cavities 308 and/or to transmit fluid from a port 306 to the cavities 308.

The flexible material of the outer wall 310 may be formed to a desired shape. In the embodiment of FIG. 3, the outer wall 310 is formed to the shape of a concave roller, defining a groove 314 with inclined surfaces 318 and an apex surface 316. The fluid in the cavity 308 may be pressurized to support the flexible material of the outer wall 310 in the region between the support structures 302. The pressure of the fluid may be selected to facilitate the application of compressive forces to the layers of material through the outer wall 310, while the outer wall 310 remains flexible to adjust to the changes of shape of the associated feature (e.g., stiffener) as additional layers are added. For example, a radius at the transition defined by angles A and B between the apex surface 316 and the inclined surfaces 318 may increase as additional layers are added to the associated feature. A width of the apex surface 316 may also increase as additional layers are added. The pressure of the fluid in the cavity 308 may be selected to facilitate the outer wall 310 moving to adjust the position of the inclined surfaces 318 to match the associated feature. In some embodiments, the pressure of the fluid in the cavity 308 is selected to match a compressing pressure of the associated forming device 100 while facilitating the movement of the outer wall 310.

In some embodiments, as illustrated in FIG. 3, portions of the outer wall 310 may have different thicknesses. The outer wall 310 illustrated in FIG. 3 includes at least three distinct regions, a flexible region 320, a strengthened region 322, and a supported region 324. The flexible region 320 of the outer wall 310 has the lowest thickness, and the flexible region 320 may be selected to encompass the regions subject to the most change as additional layers are added, such as the apex surface 316, the angles A and B and portions of the inclined surfaces 318. The strengthened region 322 of the outer wall 310 includes an increased thickness from the flexible region 320. The strengthened region 322 may increase a rigidity in areas where less flexibility is needed and may impede deformation of the outer wall 310 in these areas. For example, FIG. 3 illustrates a strengthened region 322 at the transition from the inclined surfaces 318 to a flat outer surface (e.g., full diameter surface). The strengthened region 322 may maintain the profile of the transition (e.g., angle, radius, etc.) to compact the layers of material at the transition point. While the thicker material of the outer wall 310 in the strengthened region 322 may impede deformation, the strengthened region 322 may facilitate movement of the entire strengthened region 322, while maintaining the shape of the strengthened region 322, such that the entire region may accommodate changes in shape of the associated component, such as an increased width of the component as additional layers are added. The supported region 324 is the portion of the outer wall 310 that is coupled to the support structure 302. The support for the outer wall 310 in the supported region 324 is provided by the support structures 302. In some embodiments, as illustrated in FIG. 3, the supported region 324 has the greatest thickness of the outer wall 310. This greater thickness may provide a cushioning or damping effect between the rigid support structure 302 and the associated component. In other embodiments, the thickness of the outer wall 310 in the supported region 324 may be less than or equal to the thickness of the outer wall 310 in the other regions 320, 322. The central support structure 326 is configured to create a second supported region in the area of the apex surface 316.

The outer wall 310 may be secured or bonded to the support structures 302 and 326 through an adhesive, such as glue, epoxy, etc., or an interference fit. In some embodiments, the support structures 302, 326 and the outer wall 310 may include complementary features configured to secure the outer wall 310 to the support structures 302, 326. The interface between the outer wall 310 and the support structures 302 is configured to maintain a fluid tight interface, such that the interface maintains the fluid within the cavity 308 and facilitates pressurization of the fluid in the cavity 308 as described above. The pressure of the fluid in the cavity 308 may remain constant during the use and operation of the roller 300. In some embodiments, additional seals or sealing structures are included in at least one of the support structures 302 and the outer wall 310 to facilitate the fluid tight interface.

Figure 4:
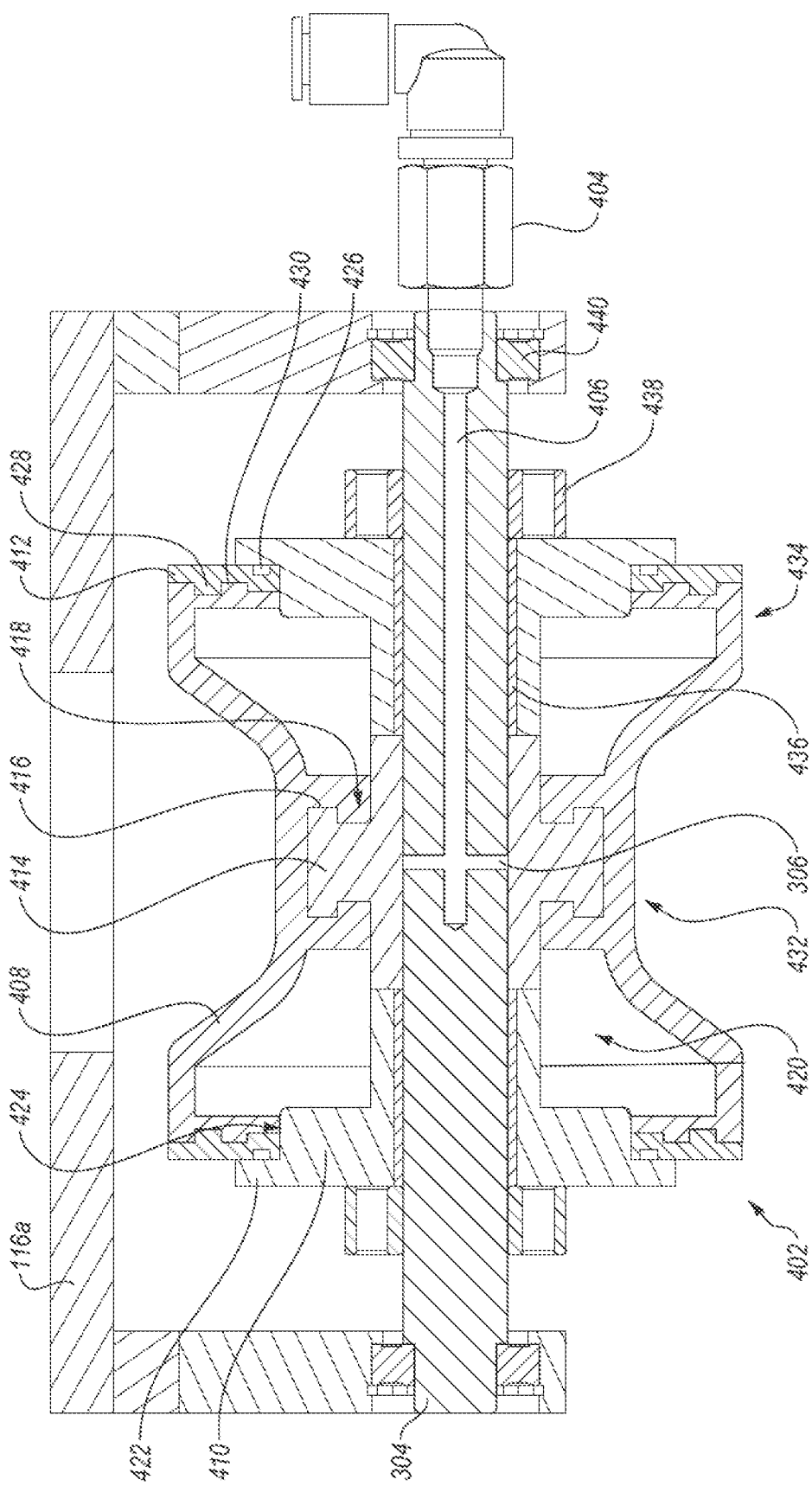

FIG. 4 illustrates a cross-sectional view of an embodiment of a conformable roller 402 coupled to appendage 116a of a lay-up forming device 100. The conformable roller 402 is coupled to the appendage 116a through an axle 304, such that the axle 304 is a mounting structure. The axle 304 may be coupled to the appendage 116a through bearings 440, which may facilitate rotation of the axle 304 and the conformable roller 402 relative to the appendage 116a. A fluid connection 404 is coupled to the axle 304 through a rotational coupling. The fluid connection 404 is operatively coupled to a fluid passage 406 defined in the axle 304. The fluid passage 406 provides a fluid path from the fluid connection 404 to one or more ports 306. As described above, the ports 306 may be directed to one or more cavities 420 defined in the conformable roller 402, such that the ports 306 complete a fluid connection between the fluid connection 404 and the cavities 420, such that the fluid connection 404 is in fluid communication with the cavities 420 through the ports 306. For example, a gap or clearance may be maintained between a support structure 414 and the axle 304, such that fluid may be transmitted from the ports 306 to the cavities 420 through the gap or clearance as discussed above.

The fluid connection 404 may be coupled to a fluid supply, such as a fluid reservoir. The fluid connection 404 may be a fluid line (e.g., hose, pipe, etc.) coupled to the axle 304 through a rotatable fitting (e.g., a rotary union fitting). The fluid connection 404 may also be connected to a device for pressurizing the fluid being supplied to the fluid connection 404, such as a pump, compressor, etc. In some embodiments, the fluid connection 404 may include a pressure regulator, such as a pressure-reducing regulator or a back-pressure regulator. The pressure regulator is configured to control pressure being provided through the fluid connection 404 to the cavities 420. In some embodiments, the pressure regulator is a manual pressure regulator set and/or adjusted by an operator. In other embodiments, the pressure regulator may be automated, such that the regulator may be electronically controlled through a signal from a controller to control a pressure being supplied to the cavities 420.

Similar to the conformable roller 300 described above, the cavities 420 in the conformable roller 402 may be defined between the axle 304 and an outer wall 408. The outer wall 408 may be supported and/or clamped by one or more support structures 410, 412, 414, and 438. The support structures 410, 412, 414, and 438 may be formed from a substantially rigid materials, such as a metal material (e.g., aluminum, titanium, steel, or alloys thereof), or a rigid polymer (e.g., polytetrafluoroethylene, polyvinyl chloride, acrylonitrile butadiene styrene, etc.). The outer wall 408 may be formed from a flexible material, such as flexible polymer materials (e.g., polysiloxane, polyethylene, or polypropylene) or rubber materials.

As illustrated in FIG. 4, the conformable roller 402 includes a primary support structure 410 and a collar support structure 438 on each axial end of the axle 304. The primary support structure 410 and the collar support structure 438 provide both axial support and radial support to the outer wall 408. The primary support structure 410 includes a radial extension 422 that may be configured to substantially prevent movement of the outer wall 408 in an axial direction and a shelf 424 upon which the outer wall 408 may rest, such that the shelf 424 supports the outer wall 408 in a radial direction. The collar support structure 438 provides additional axial support to the primary support structure 410. The collar support structure 438 is secured to the axle 304, such that the collar support structure maintains an axial position along the axle 304. An interface between the collar support structure 438 and an outer axial end of the primary support structure 410 is configured to substantially prevent the primary support structure 410 from moving in an outward axial direction.

A seal structure 412 may be positioned between the outer wall 408 and the primary support structure 410 at an axial end region 434 of the flexible roller 402 where the roller has the largest diameter. For example, as illustrated in FIG. 4, the seal structure 412 is positioned between the outer wall 408 and the radial extension 422 of the primary support structure 410. The seal structure 412 may include a seal 426, such as a gasket or O-ring, positioned between the seal structure 412 and the radial extension 422 of the primary support structure 410 to form an outer seal. The seal structure 412 may also include one or more ribs 428 configured to interface with complementary ribs 430 formed in the outer wall 408. The interface between the one or more ribs 428 and the complementary ribs 430 may be configured to secure the outer wall 408 radially relative to the conformable roller 402 (e.g., to substantially prevent the outer wall 408 from moving in a radially outward direction when the fluid in the cavities 420 is pressurized). The flexible material of the outer wall 408 in the complementary ribs 430 may also form a seal (e.g., a fluid tight seal) with the ribs 428 of the seal structure 412. The seals formed between the seal structure 412 and the primary support structure 410 and outer wall 408 may substantially prevent fluid from leaving the cavities 420 defined between the outer wall 408, the axle 304, and the support structures 410 and 414. Additional seals 436 are positioned between the primary support structures 410 and the axle 304. The seals 436 are configured to maintain fluid pressure within the cavities 420 by forming a fluid tight seal between the primary support structures 410 and the axle 304. In some embodiments, the seal structure 412 and the outer wall 408 may be secured to the primary support structure 410 through an inner support structure sandwiching the outer wall 408 and seal structure 412 between the inner support structure and the primary support structure 410. For example, the outer wall 408 and seal structure 412 may be positioned between the inner support structure and the radial extension 422 of the primary support structure 410 in the region over the shelf 424 of the primary support structure 410. In other embodiments, as illustrated in FIG. 4, the axial force between the outer wall 408 and the seal structure 412 and/or the primary support structure 410 is applied through fluid pressure in the cavity 420 and elastic properties of the flexible material of the outer wall 408. In some embodiments, additional bonding materials (e.g., glue or epoxy) are positioned in one or more of the interfaces between the support structures 410, 412, 414, and 426 and/or between the support structures 412, 414 and the outer wall 408. The bonding materials may be configured to assist in the sealing properties or securing properties of the respective interfaces.

In some embodiments, a secondary support structure 414 is included in an apex region 432 of the outer wall 408. The secondary support structure 414 may be configured to provide additional radial support to the apex region 432 of the outer wall 408. The secondary support structure 414 may include a retaining structure 416 and a recess 418 configured to interface with complementary features in the outer wall 408. The interface between the outer wall 408 and the retaining structure 416 and recess 418 of the secondary support structure 414 may be configured to secure the outer wall 408 in the apex region 432 to the secondary support structure 414. The secondary support structure 414 may maintain the outer wall 408 in a substantially even cylindrical shape (e.g., a right cylinder), such that the flexible roller 402 may provide a substantially even or flat force to the apex surface of the corresponding composite part during the lay-up process (e.g., the apex may maintain a substantially flat profile). Thus, the secondary support structure 414 may be configured to substantially prevent the outer wall 408 from deforming (e.g., into a conical or hyperbolic shape) or ballooning (e.g., expanding radially outward when the cavities 420 are pressurized) in the apex region 432.

Figure 5:
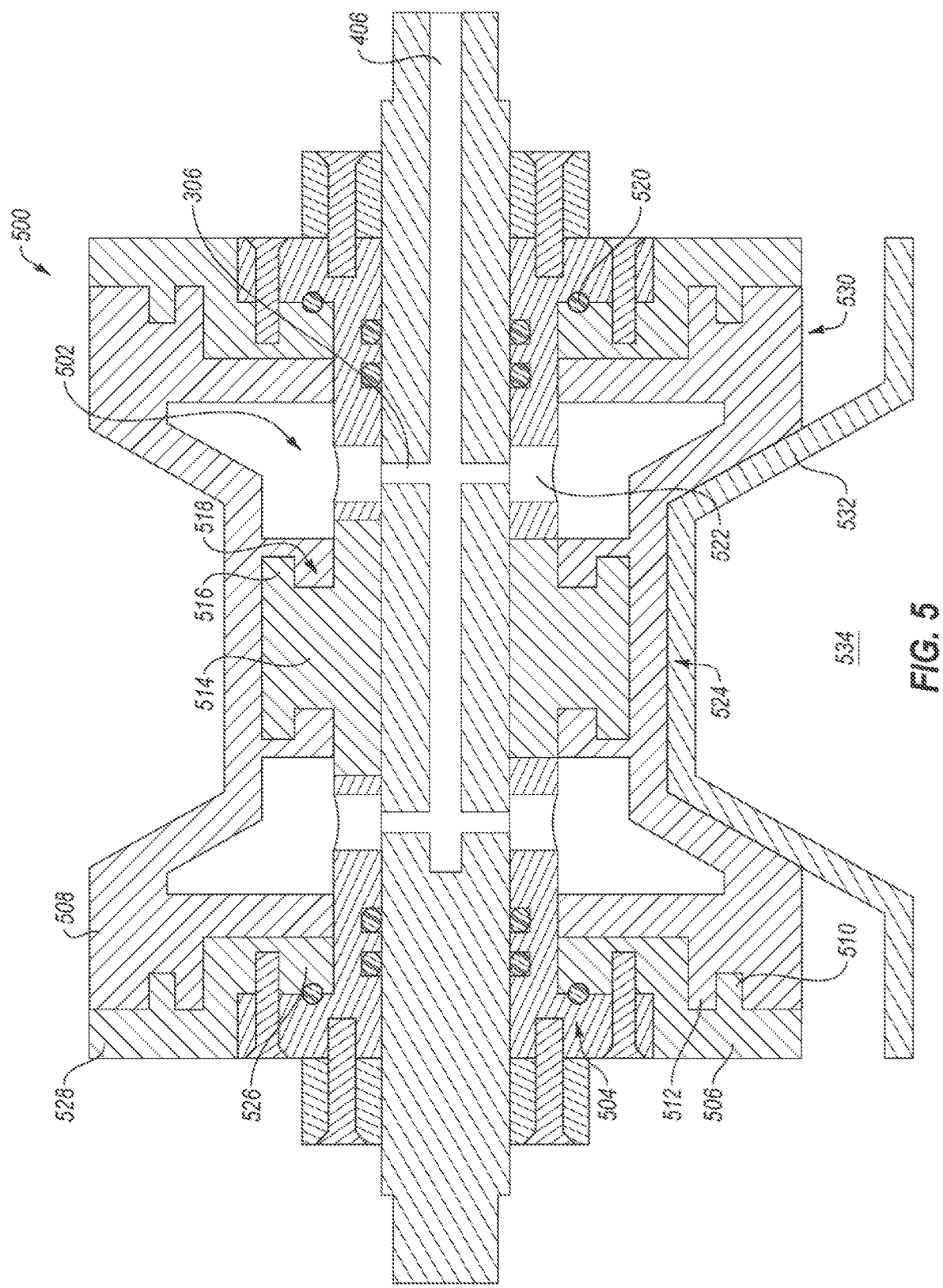

FIG. 5 illustrates a cross-sectional view of another embodiment of a conformable roller 500. The conformable roller 500 includes an outer wall 508, axle 304, and multiple support structures 504, 506, and 514 defining cavities 502 between the outer wall 508, axle 304, and the support structures 504, 506, and 514. The cavities 502 are configured to be filled with a fluid supplied through the ports 306 in the axle 304. Additional ports 522 may be defined in support structure 504, which may correspond to the ports 306 in the axle 304 and form a fluid path from the fluid passage 406 in the axle 304 to the cavities 502.

FIG. 5 illustrates another arrangement of support structures 504, 506, and 514 configured to support the outer wall 508 in a concave shape defining an apex region 524 similar to the flexible rollers 300 and 402. The conformable roller 500 illustrated in FIG. 5 includes inner support structures 504, primary support structures 506, and a secondary support structure 514. The inner support structures 504 are positioned adjacent the axle 304 and sealed to the shaft through seals 536. In some embodiments, the inner support structure 504 and the secondary support structure 514 are configured to be sealed to and secured to the axle 304, such that the axle 304, the inner support structure 504, and the secondary support structure 514 rotate together. In other embodiments, the inner support structure 504 and the secondary support structure 514 may be configured to rotate about the axle 304. For example, the inner support structures 504 and the secondary support structure 514 may include one or more bearings or other friction reducing elements in addition to the seals 536 at an interface between the axle 304 and the inner support structures 504 or the secondary support structure 514.

The primary support structures 506 may be secured (e.g., mechanically secured or bonded) to the inner support structure 504 and sealed with seal 520. The primary support structures 506 may be configured to form an axially outer surface of the conformable roller 500 and to secure the outer wall 508 both radially and axially to the inner support structures 504. In the embodiment illustrated in FIG. 5, the primary support structures 506 is shaped to mechanically lock with the outer wall 508 and is bonded to 528 to create a seal. The primary support structures 506 include a lower flange 526 and an upper flange 528. The lower flange 526 is secured to the inner support structure 504, such that the connection between the lower flange 526 of the primary support structure 506 and the inner support structure 504 substantially prevents the primary support structure 506 from moving axially or radially relative to the inner support structure 504. The connection between the lower flange 526 of the primary support structure 506 and the 504 may be a hardware connection (e.g., screws, bolts, pins, etc.), an adhesive connection (e.g., glue, epoxy, etc.), or an interference connection (e.g., complementary geometry, threaded connection, etc.). The lower flange 526 also includes one or more seals 520 (e.g., gasket, O-ring, etc.) positioned between the lower flange 526 and the inner support structure 504 that may be configured to substantially prevent fluid in the cavities 502 from passing through the interface between the lower flange 526 of the primary support structure 506 and the inner support structure 504. The upper flange 528 extends radially away from the inner support structure 504, such that the upper flange 528 forms an outer axial surface of the flexible roller 500. The upper flange 528 also extends radially to a full diameter of the flexible roller 500, such that the upper flange 528 forms a portion of the outer forming surface and a corner of the forming surface in a full diameter region 530 of the flexible roller 500.

As described above, the support structures 504, 506, and 514 are formed from rigid materials, such that when connected with the outer wall 508, the ridged surfaces provide positioning and compaction on the flat regions of the stiffener while allowing the outer wall 508 to adapt to the changing radii as material layers are added to the stiffener, with even pressure on both the flats and radii. The upper flange 528 of the primary support structure 506 may be formed from a rigid material, such that the outer surfaces of the flexible roller 500 at the axial ends of the flexible roller 500 may be rigid and provide a greater resistance to deformation than the flexible material of the outer wall 508. In the embodiment of the flexible roller 500 illustrated in FIG. 5, the upper flange 528 is secured to the outer wall 508 through a rib 510 which interfaces with a complementary rib 512 in the outer wall 508. The flexible material of the outer wall 508 interfacing with the rigid material of the upper flange 528 may form a fluid tight seal in the interface between the rib 510 and the complementary rib 512 configured to substantially prevent fluid in the associated cavity 502 from passing through the interface between the outer wall 508 and the upper flange 528. The interface between the rib 510 and the complementary rib 512 may also secure the outer wall 508 radially relative to the primary support structure 506.

Similar to the secondary support structure 414 described above, the secondary support structure 514 may be configured to provide additional radial support to the apex region 524 of the outer wall 508. The secondary support structure 514 includes a retaining structure 516 and a recess 518 configured to interface with complementary features in the outer wall 508. The interface between the outer wall 508 and the retaining structure 516 and recess 518 of the secondary support structure 514 may be configured to secure the outer wall 508 in the apex region 524 to the secondary support structure 514, such as through a bonded connection or a mechanical connection. The secondary support structure 514 may maintain the outer wall 508 in a substantially even cylindrical shape (e.g., a right cylinder), such that the flexible roller 500 may provide a substantially even or flat force to the apex surface of the corresponding composite part 532 over a mold 534 during the lay-up process. Thus, the secondary support structure 514 may be configured to substantially prevent the outer wall 408 from deforming in the apex region 432.

Figure 6:
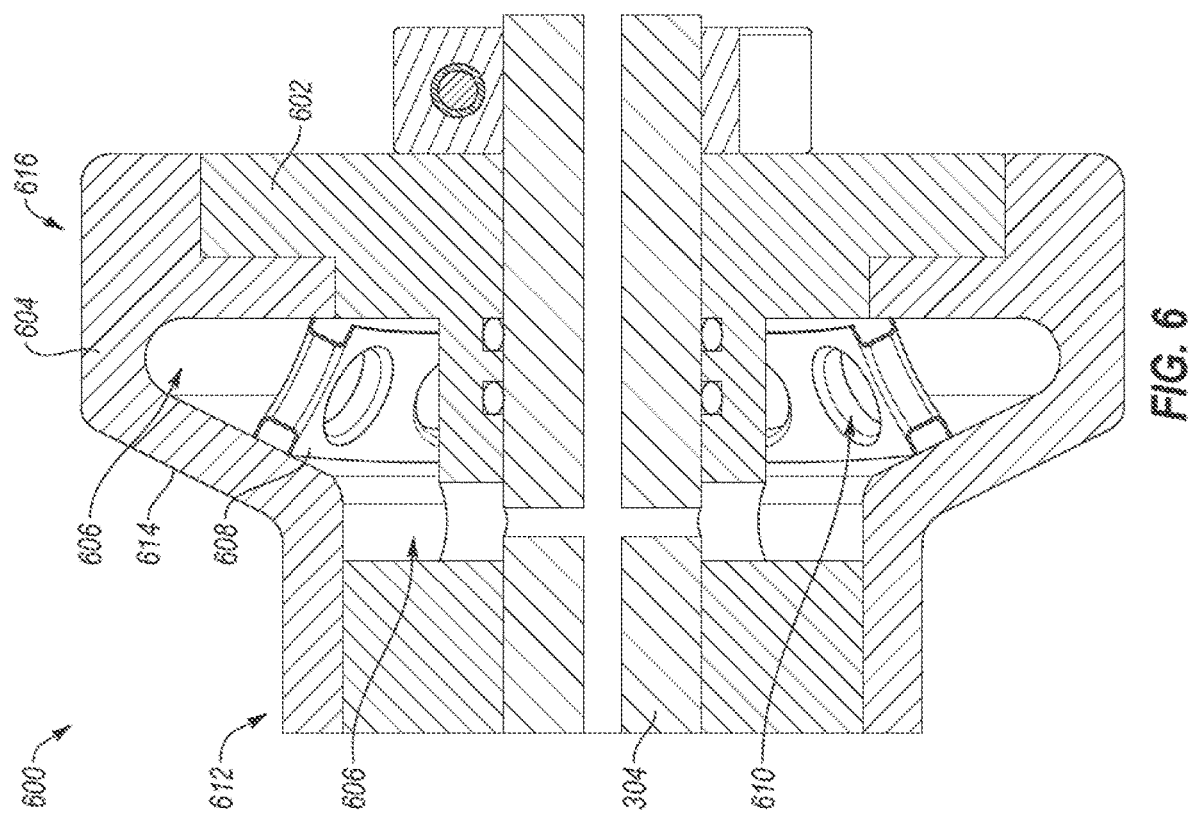

FIG. 6 illustrates an enlarged cross-sectional view of a portion of a conformable roller 600. Similar to the conformable rollers 300, 402, and 500 the conformable roller 600 includes a flexible outer wall 604 coupled to a rigid support structure 602 defining a cavity 606. The cavity 606 is configured to be filled with a fluid supplied through ports 306 in the axle 304. The conformable roller 600 illustrated in FIG. 6, includes a stiffening element 608 positioned in the cavity 606. The stiffening element 608 includes apertures 610 configured to provide a fluid passage or fluid communication through the stiffening element 608. The stiffening element 608 may be formed from a rigid material, such as a metal material or rigid polymer similar to the support structures 602. The stiffening element 608 may be configured to reduce a flexibility of the outer wall 604 in a particular region while maintaining the flexibility of the outer wall 604 in other regions. For example, the stiffening element 608 of the conformable roller 600 illustrated in FIG. 6 may reduce the flexibility of the outer wall 604 along the inclined surface 614 extending between the apex region 612 and the full diameter region 616. Thus, the outer wall 604 may maintain flexibility at the transitions between the apex region 612 and the inclined surface 614 and between the full diameter region 616 and the inclined surface 614 while having reduced flexibility in the apex region 612, the full diameter region 616, and along the inclined surface 614 where geometry changes due to adding layers are less likely. The stiffening element 608 can also be included in the cavities 308, 420, 502 of the other flexible rollers 300, 402, 500 described herein for added control of the flexibility/rigidity of the respective outer walls 310, 408, 508.

While FIGS. 3-6 illustrate embodiments of conformable rollers for forming particular features of a stiffener profile in a lay-up process, similar arrangements may be used to form conformable rollers having other shapes for forming other shapes in a lay-up process. FIGS. 7-11 illustrate several additional embodiments of conformable rollers. The conformable rollers described herein are exemplary and non-limiting.

Figure 7:
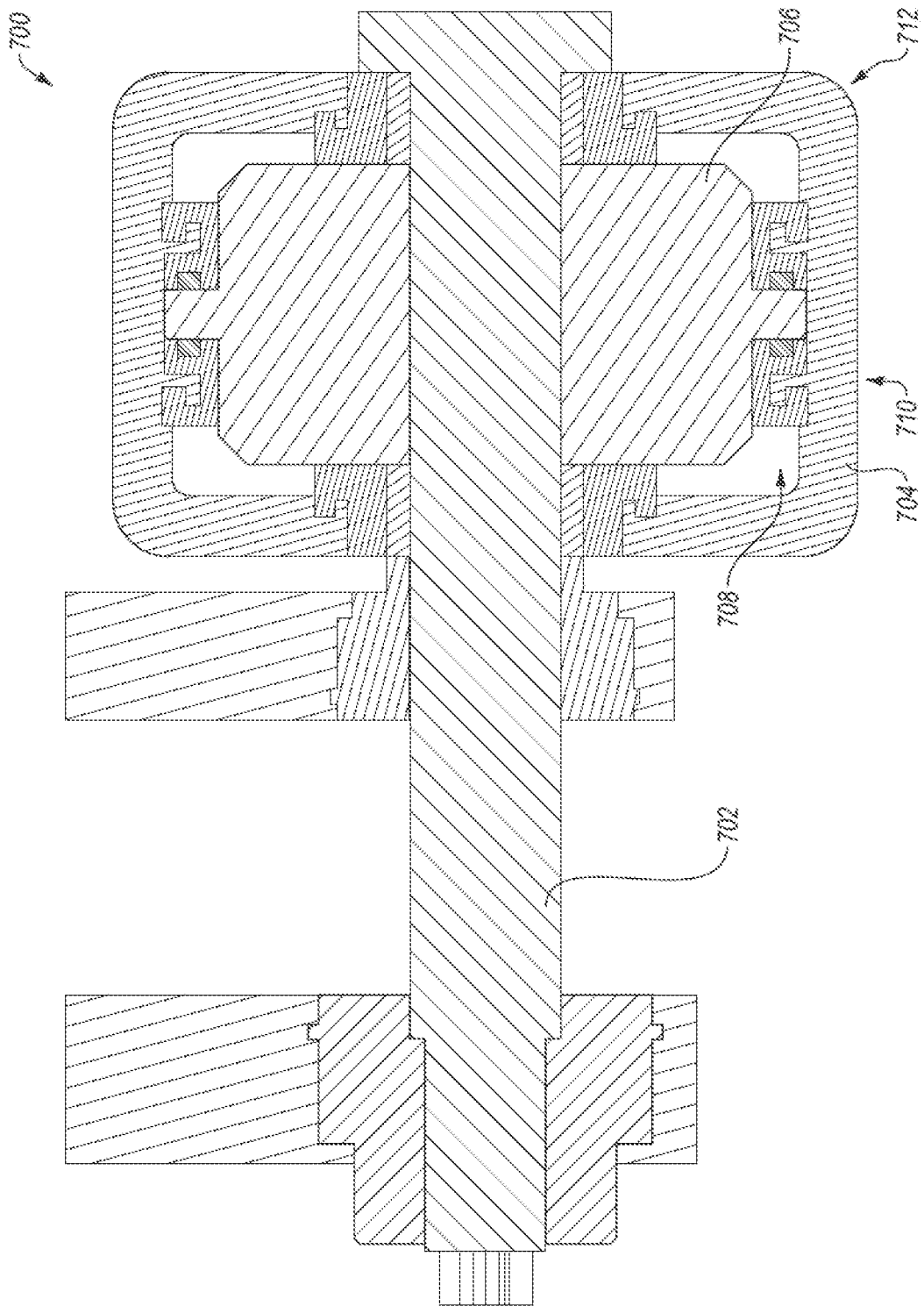

FIG. 7 illustrates a cross-sectional view of a conformable roller 700. The conformable roller 700 is a roller configured to compress flat regions of an associated part during a lay-up process while at the same time compacting material in an adjoining radius feature. The conformable roller 700 is coupled to an axle 702. In some embodiments, the conformable roller 700 is configured to rotate with the axle 702. Similar to the axle 304 (FIGS. 3-6), the axle 702 may be configured to supply fluid to cavities 708 defined within the conformable roller 700 between a flexible outer wall 704 and rigid support structures 706. The support structure 706 may be secured to the flexible outer wall 704 of the conformable roller through one or more securing clamps 714. The support structure 706 and securing clamps 714 may correspond with a flat contact region 710 of the conformable roller 700 configured to contact planar portions of an associated part during the lay-up process. The cavities 708 may be defined in a region near the corner regions 712 where additional flexibility may facilitate changes to a radius at a corner as additional layers are added during the lay-up process.

Figure 8:
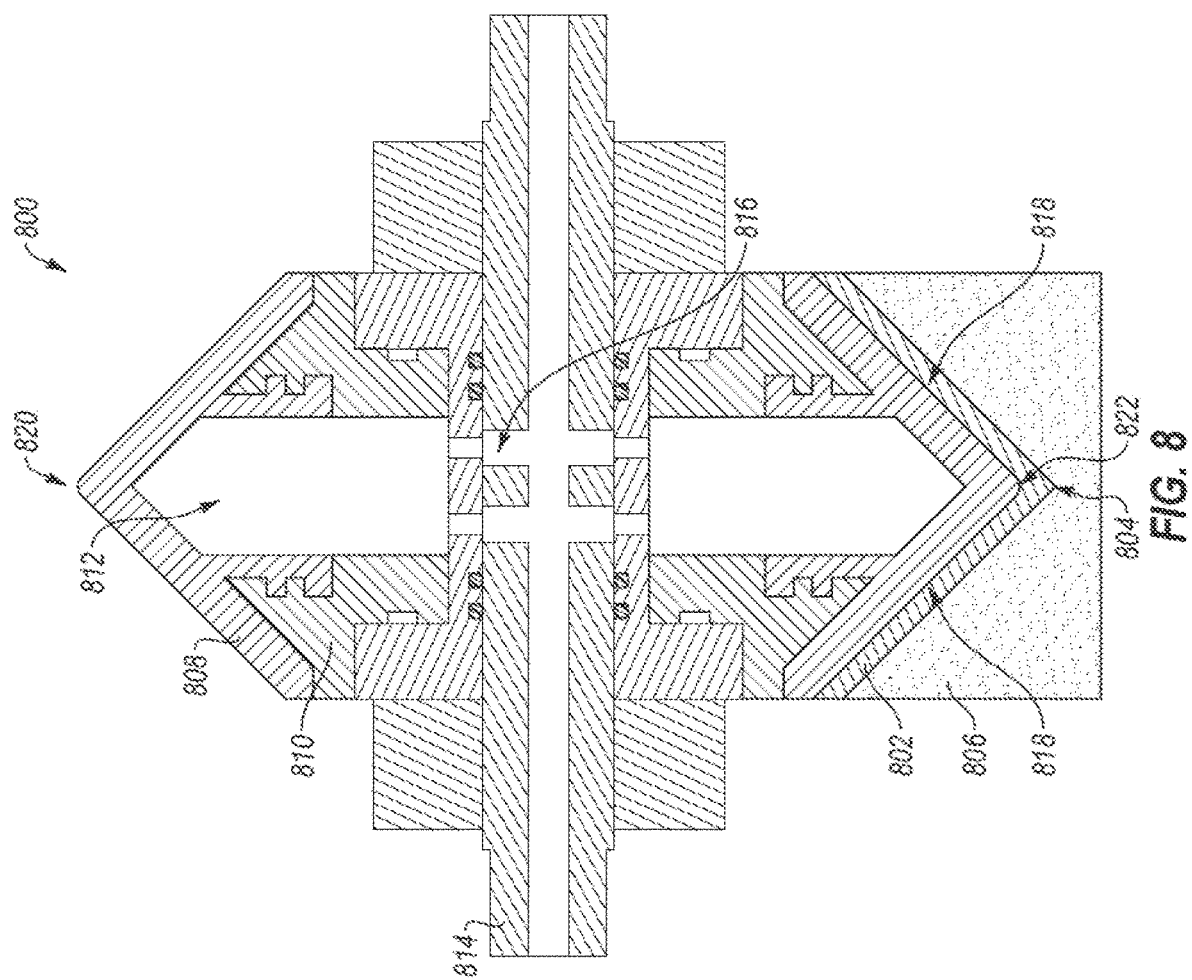

FIG. 8 illustrates a cross-sectional view of a conformable roller 800. The conformable roller 800 is a corner roller, similar to corner roller 122 (FIG. 1B), configured to compress layers of a material 802 into a corner 804 defined in a tool 806, such as a mandrel, mold, etc., during a lay-up process. The conformable roller 800 is coupled to an axle 814. In some embodiments, the conformable roller 800 is configured to rotate with the axle 814. Similar to the axle 304 (FIGS. 3-6), the axle 814 may be configured to supply fluid to a cavity 812 defined within the conformable roller 800 between a flexible outer wall 808 and rigid support structures 810 through one or more ports 816. The support structures 810 may correspond with flat contact regions 818 of the flexible roller 800 configured to contact the material 802 over planar portions of the tool 806 during the lay-up process. The cavity 812 may be defined in a region corresponding to a corner region 820 configured to be complementary to the corner 804 defined in the tool 806. The additional flexibility created by the fluid-filled cavity 812 is configured to facilitate changes to a radius of a corner 822 of the material 802 as additional layers of material 802 are added during the lay-up process.

Figure 9:
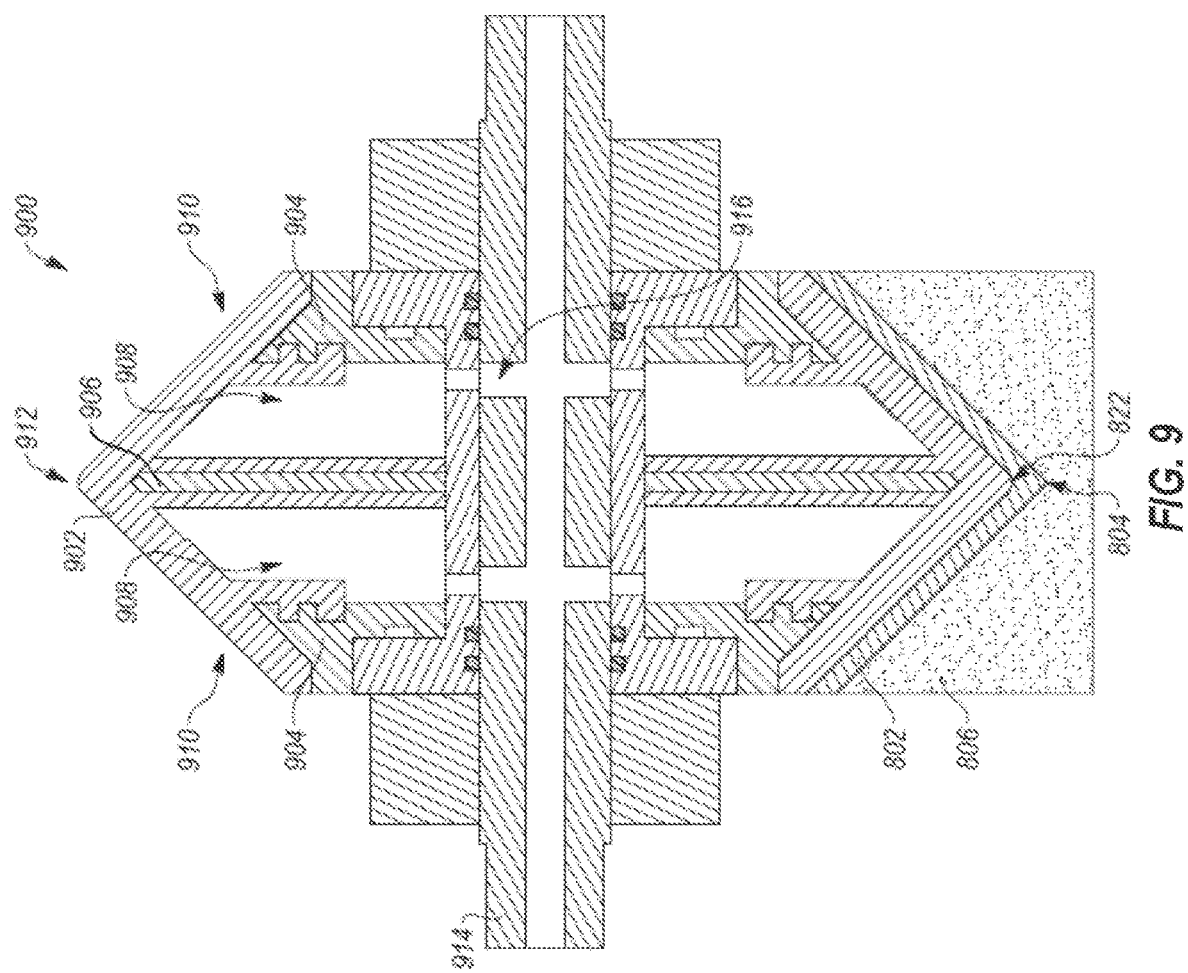

FIG. 9 illustrates a cross-sectional view of a conformable roller 900. Similar to conformable roller 800, the conformable roller 900 is a corner roller, similar to corner roller 122 (FIG. 1), configured to compress layers of a material 802 into a corner 804 defined in a tool 806 during a lay-up process. The conformable roller 900 is coupled to an axle 914. Similar to the axle 304 (FIGS. 3-6), the axle 914 may be configured to supply fluid to cavities 908 defined within the conformable roller 900 between a flexible outer wall 902 and rigid support structures 904, 906 through one or more ports 916. The support structures include outer support structures 904 and a central support structure 906. The outer support structures 904 may correspond with flat contact regions 910 of the conformable roller 900 configured to contact the material 802 over planar portions of the tool 806 during the lay-up process. The central support structure 906 may be positioned in a corner region 912 configured to be complementary to the corner 804 defined in the tool 806. The central support structure 906 may be configured to provide a rigid support directed into the corner 804 of the tool 806. The central support structure 906 may be relatively narrow in comparison with the outer support structures 904. For example, the central support structure 906 may be configured to apply a force at a point of the corner region 912 while facilitating the radius of the corner region 912 to flex to accommodate changing radii in an associated corner 822 formed by the material 802 over the corner 804 defined in the tool 806. The cavities 908 may be defined between the central support structure 906 and the outer support structures 904. The fluid-filled cavities 908 may facilitate some movement of the outer wall 902 around the corner region 912 to facilitate changes to a radius at the corner 804 as additional layers of material 802 are added during the lay-up process.

Figure 10:
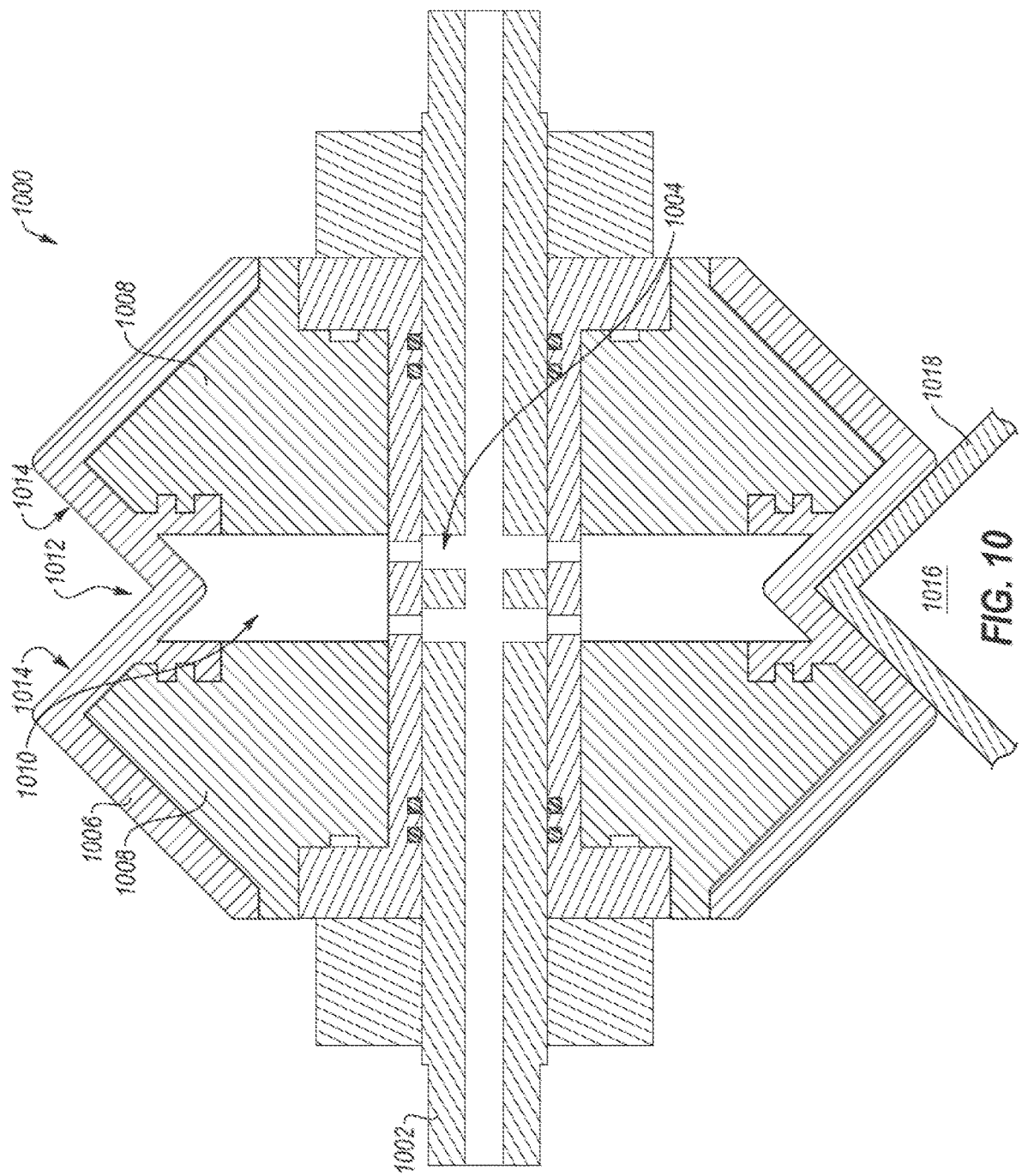

FIG. 10 illustrates a cross-sectional view of a conformable roller 1000. The conformable roller 1000 is a reverse corner roller or male corner roller configured to compress layers of a material 1018 around a male corner defined by a tool 1016 during a lay-up process. The conformable roller 1000 is coupled to an axle 1002. Similar to the axle 304 (FIGS. 3-6), the axle 1002 may be configured to supply fluid to cavity 1010 defined within the conformable roller 1000 between a flexible outer wall 1006 and rigid support structures 1008 through one or more ports 1004. The support structures 1008 may correspond with outer regions of the conformable roller 1000 configured to locate the roller and compact flat regions of the material around the corner region 1012. In the embodiment illustrated in FIG. 10, the support structures 1008 are configured to extend into a region corresponding to inclined surfaces 1014 of the outer wall 1006 leading into the corner region 1012, such that the support structures 1008 may provide additional support to the outer wall 1006 over a portion of the inclined surfaces 1014. The cavity 1010 is defined between the support structures 1008 corresponding with the corner region 1012 of the conformable roller 1000. The fluid-filled cavity 1010 may facilitate flexibility in the outer wall 1006 around the corner region 1012 to facilitate changes to a radius around the corner as additional layers of material are added during the lay-up process.

Figure 11:
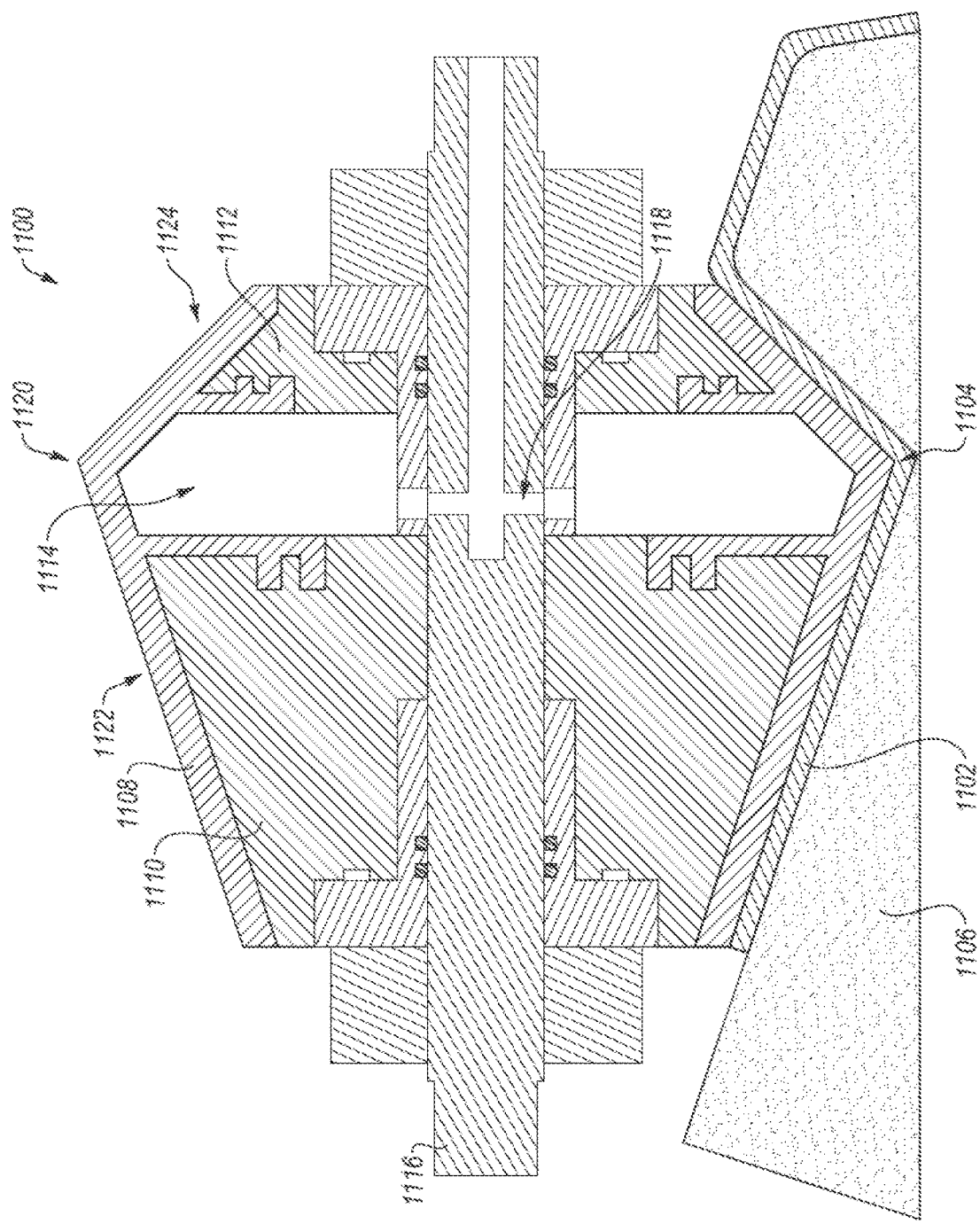

FIG. 11 illustrates a cross-sectional view of a conformable roller 1100. The conformable roller 1100 is a corner roller configured to compress layers of a material 1102 into a female corner 1104 defined in a tool 1106, such as a mandrel, mold, etc., during a lay-up process. The conformable roller 1100 is coupled to an axle 1116. Similar to the axle 304 (FIGS. 3-6), the axle 1116 may be configured to supply fluid to a cavity 1114 defined within the conformable roller 1100 between a flexible outer wall 1108 and rigid support structures 1110, 1112 through one or more ports 1118. The support structures 1110, 1112 may correspond with flat contact regions 1122, 1124 of the conformable roller 1100 configured to contact the material 1102 over planar portions of the tool 1106 during the lay-up process. In the embodiment illustrated in FIG. 11, the contact regions 1122, 1124 of the conformable roller 1100 have different lengths. Thus, a first support structure 1110 corresponding to a first contact region 1122 is larger than a second support structure 1112 corresponding to a second contact region 1124. The cavity 1114 may be defined in a region corresponding to a corner region 1120 configured to be complementary to the corner 1104 defined in the tool 1106. The additional flexibility created by the fluid-filled cavity 1114 may facilitate changes to a radius at the corner 1104 as additional layers of material 1102 are added during the lay-up process.

Figure 12A:
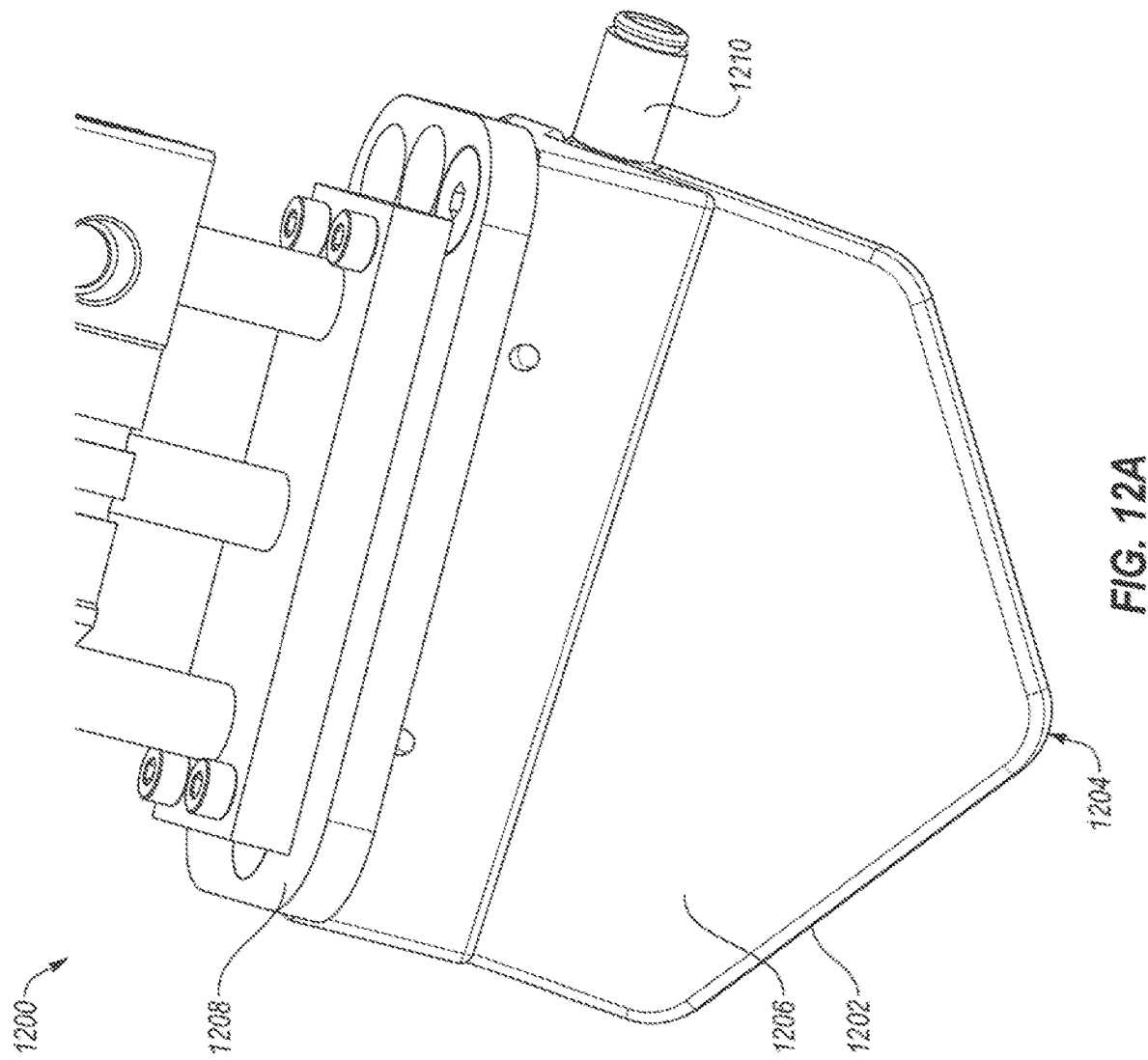
FIG. 12A illustrates an enlarged perspective view of a flexible slider configured to be coupled to the forming device of FIG. 1.
Figure 12C:
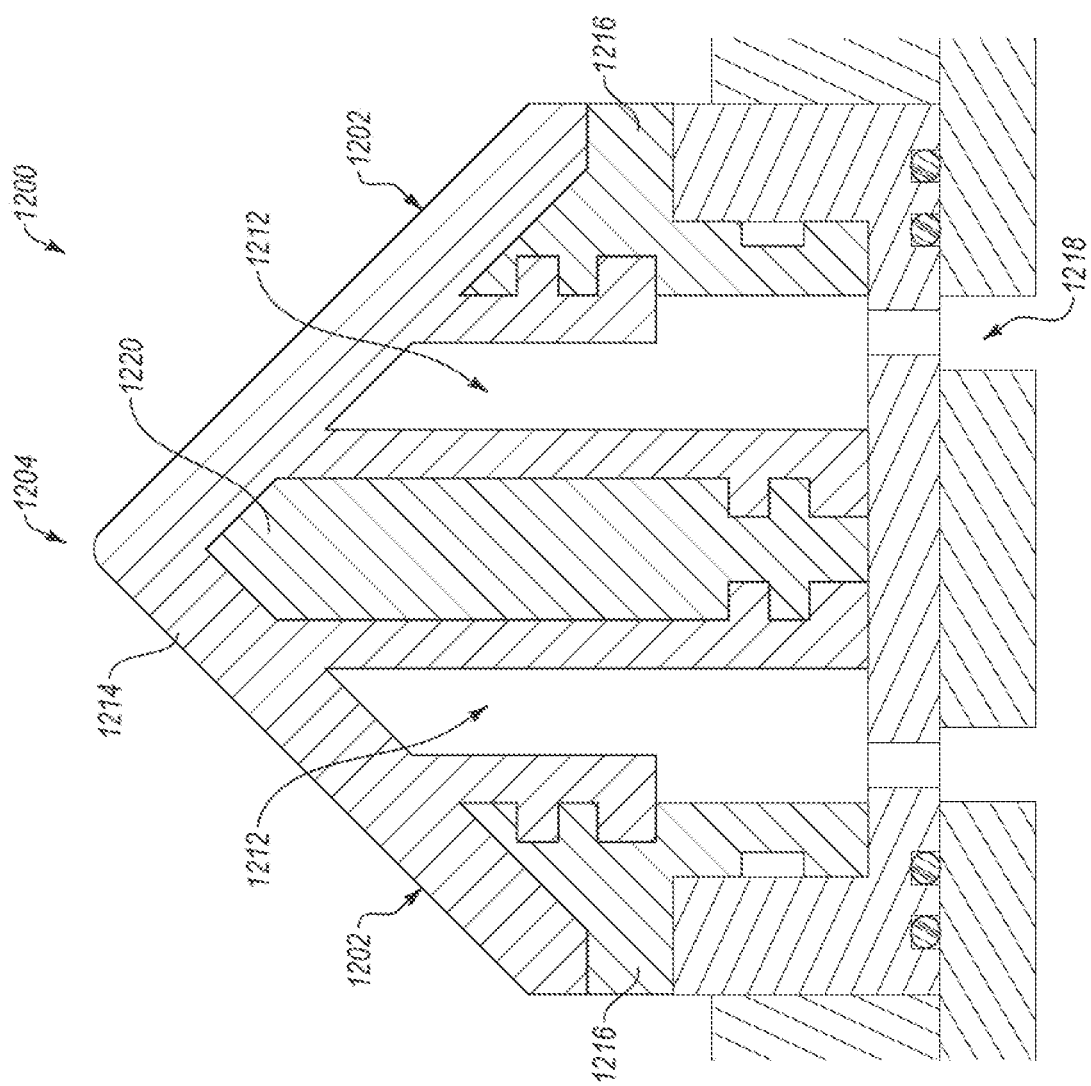
FIG. 12C illustrates an enlarged cross-sectional view of an embodiment of the flexible slider of FIG. 12A.

In addition to rollers a forming device may also include forming elements that do not roll along a surface, such as the conformable sliders 120 illustrated in FIG. 1B. FIGS. 12A and 12B illustrate an embodiment of a conformable slider 1200. FIG. 12A illustrates a perspective view of the conformable slider 1200 and FIGS. 12B and 12C illustrate cross-sectional views of different embodiments of the conformable slider 1200.

The conformable slider 1200 may include a contact surface 1202 configured to apply a pressure to a flexible sheet of material as the conformable slider 1200 slides along a surface of the material. The contact surface 1202 may be shaped to be complementary to a desired shape of the material as defined by an underlying tool, such as tool 806 (FIG. 8) or tool 1106 (FIG. 11). For example, in the embodiment of the conformable slider 1200 illustrated in FIG. 12A and FIG. 12B, the contact surface 1202 defines an apex 1204 which may be complementary to a corner defined in the underlying tool. The conformable slider 1200 may also include a support structure 1206 extending between the contact surface 1202 and a mounting structure 1208, where the mounting structure 1208 is configured to secure the conformable slider 1200 to an associated appendage of a forming device.

The conformable slider 1200 may be configured to include a flexible region similar to the flexible rollers 300, 402, 500, 600, 700, 800, 900 described above. The conformable slider 1200 may be configured to receive a fluid through a fluid connection 1210 to apply and/or change a pressure in the flexible region. The fluid connection 1210 may supply the fluid to a cavity 1212 defined within the conformable slider 1200 through one or more ports 1218. For example, in the embodiment illustrated in FIG. 12B, the fluid connection 1210 is operably coupled to a port 1218 which supplies fluid from the fluid connection 1210 to a cavity 1212 defined in a central region of the flexible conformable slider 1200 proximate the apex 1204 defined by the contact surface 1202. The contact surface 1202 may be formed by an outer wall 1214, which may be formed from a flexible material, such as elastomers, flexible polymer materials (e.g., polyethylene or polypropylene), or rubber materials.

The cavity 1212 may be defined within the support structure 1206 of the conformable slider 1200. The support structure 1206 may also include semi-rigid support structures 1216. Similar to the flexible rollers 300, 402, 500, 600, 700, 800, 900 described above, the support structures 1216 may be configured to support the outer wall 1214 in a substantially rigid manner and the cavity 1212 may facilitate flexibility of the outer wall 1214 in the apex 1204 to accommodate changes in dimensions, such as radii, angles, etc., of the associated features as layers of material are added.

In the embodiment illustrated in FIG. 12C, the fluid connection 1210 is operably coupled to a ports 1218 which supply fluid from the fluid connection 1210 to cavities 1212 defined in the flexible conformable slider 1200 proximate the apex 1204 defined by the contact surface 1202. The contact surface 1202 may be formed by an outer wall 1214, which may be formed from a flexible material, such as elastomers, flexible polymer materials (e.g., polyethylene or polypropylene), or rubber materials.

The cavities 1212 may be defined within the support structure 1206 of the conformable slider 1200. The support structure 1206 may also include semi-rigid support structures 1216 and a semi-rigid central support structure 1220. Similar to the flexible rollers 300, 402, 500, 600, 700, 800, 900 described above, the support structures 1216 and 1220 may be configured to support the outer wall 1214 in a semi-rigid manner and the cavity 1212 may facilitate flexibility of the outer wall 1214 in the apex 1204 to accommodate changes in dimensions, such as radii, angles, etc., of the associated features as layers of material are added.

Figure 13:
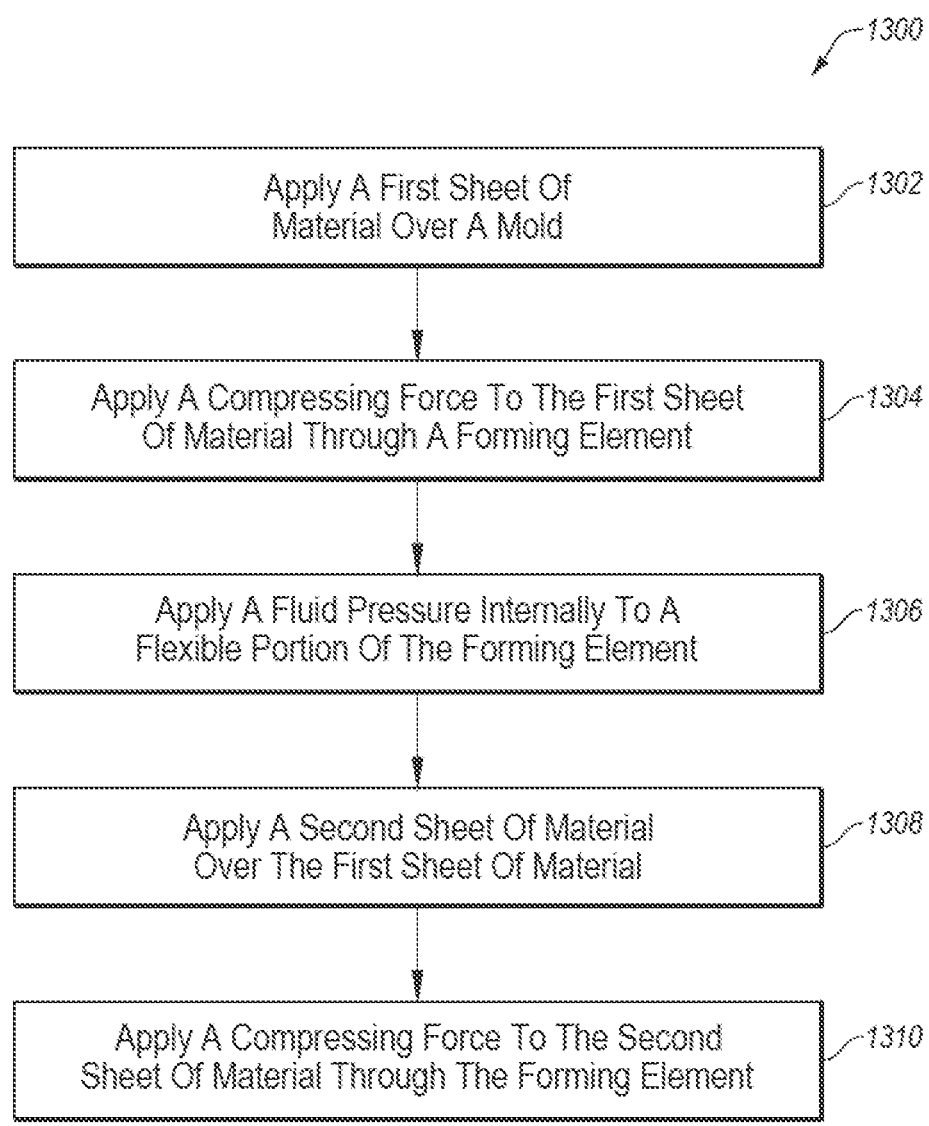
FIG. 13 illustrates a flow chart representative of a method of forming a composite structure in accordance with embodiments of the disclosure.

FIG. 13 is a flow chart illustrating a method of forming a composite structure 1300. A first sheet of material (e.g., pre-preg material, carbon fiber mat, fiberglass mat, etc.) is applied over at least a portion of a mold in act 1302. The mold may be a cylindrical mold, such as a mandrel, or a substantially flat mold. The mold may include discontinuous geometric features, such as ribs, corners, ledges, angled corners, radiused corners, recesses, protrusions, etc., configured to create the complex shapes in the resulting composite structure.

A conformable forming element (e.g., conformable roller 300, 402, 500, 600, 700, 800, 900, 1000, and 1100 or conformable slider 1200) may then be used to conform and compact the sheet of material to the mold in act 1304. The conformable forming element may be positioned adjacent to a complementary section of the mold. For example, conformable rollers 300, 402, 500, 600 may be positioned adjacent to a top surface of a ridge, conformable roller 700 may be positioned adjacent to a flat portion of the mold near a discontinuous geometric feature, conformable rollers 800, 900, 1100 or conformable slider 1200 may be positioned adjacent to an interior corner of the mold, and conformable roller 1000 may be positioned adjacent to an exterior corner of the mold. As described above, the conformable rollers 300, 402, 500, 600, 700, 800, 900, 1000, and 1100 and conformable slider 1200 include support structures adjacent to the portions of the flexible element configured to interface with substantially flat portions of the mold and the flexible elements include flexible portions configured to interface with non-flat regions that vary in shape or radii as successive plies are added, such as corners.

A fluid pressure may be applied internally to the flexible portions of the flexible elements through a pressurized fluid within a cavity defined in the flexible elements in act 1306. The fluid pressure may be applied in act 1306 at the same time as the compaction force is applied in act 1304. In some cases, the fluid pressure may be applied in act 1306 before the compaction force in applied in act 1304 and may then be maintained while the compaction force is applied in act 1304. The fluid pressure may be increased or decreased to match the compaction force applied by the flexible portions with the compressing force applied by the forming device through the rigid sections of the forming elements. In some embodiments, the fluid may be heated or cooled to compress the materials with a heated or cooled conformable forming element. For example, a heated fluid may be used to generate the fluid pressure in the conformable forming element. The heated fluid will cause the flexible outer wall of the conformable forming element to increase in temperature, such that the contact surface of the conformable forming element will be at an elevated temperature. The conformable forming element having an elevated temperature may improve the conformability or pliability of the associated material, such that material conforms to the shape of the associated mold. The heated fluid may be heated to a temperature in a range from ambient temperature (e.g., about 70° F. (about 21° C.)) to about 300° F. (about 148.9° C.), such as from about 100° F. (about 37.78° C.) to about 200° F. (about 93.33° C.). In another example, a cooled fluid may be used to generate the fluid pressure in the conformable forming element. The cooled fluid will cool the flexible outer wall of the conformable forming element. The cooling fluid may facilitate cooling the conformable forming element when the conformable forming element is applied to a hot surface. Cooling the conformable forming element may decrease wear of the conformable forming element when being used to apply pressure to the hot surface. The cooling fluid may be cooled to a temperature in the range from ambient temperatures to about 0° F. (about −17.78° C.), such as from about 40° F. (about 4.4° C.) to about 20° F. (about −6.67° C.). The heated or cooled fluid may be maintained at the elevated or cooled temperature through a recirculation system. For example, the axle of the conformable forming element may define a fluid inlet and a fluid outlet, such that fluid may pass through the associated conformable forming element. The recirculation system may then maintain the fluid at an elevated or cooled temperature while the fluid is being used to pressurize and heat or cool the associated conformable forming element.

After applying the compressive force with the conformable forming element in acts 1304 and 1306, a second sheet of material may be added over at least a portion of the first sheet of material in act 1308. After the at least a portion of the second sheet of material is added, the conformable forming element may be used to conform the sheet of material to the mold and first ply in act 1310. As each additional sheet of material is added, minor changes to the shapes of the geometric features occur, such as changes to radii about corners or transitions between the flat geometric features. As described above, the flexible portions of the conformable forming element may be configured to facilitate the minor changes in shape while still applying uniform compressive pressure to the sheets of material in all areas. In some embodiments, the fluid pressure in the flexible element may be adjusted to accommodate the changes to the compaction force with the overall forming device in act 1304.

Embodiments of the disclosure include adjustable rollers and other adjustable forming elements for applying pressure to layers of material during a lay-up process, such as a composite forming process. The adjustable rollers include portions of the contact surface of the rollers that are flexible and portions that are substantially rigid, such that some portions of the roller exhibit flexibility to adjust to changing shapes, such as radii of a corner as additional layers of material are added during a lay-up process. The rigid portions of the roller may facilitate positioning while applying compressive pressure to more constant geometry portions of the layers during the lay-up process.

A conventional lay-up process may include multiple roller changes to accommodate changing shapes due to the added material layers. Flexible or conformable rollers may result in fewer roller changes during a lay-up process, which may reduce the time and labor requirements of a lay-up process.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A lay-up forming device comprising:
    a body; and
    a roller assembly including one or more conformable rollers coupled to the body, the one or more conformable rollers comprising:
        an axle extending through an inner region of a conformable roller of the one or more conformable rollers from a first end of the conformable roller to a second opposite end of the conformable roller, the axle including a fluid port;
        a flexible outer wall;
        at least one support extending between the axle and the flexible outer wall, the support positioned along the axle at a position between the first end of the conformable roller and the second opposite end of the conformable roller; and
        at least one fluid cavity extending between the axle and the flexible outer wall, the at least one fluid cavity in fluid communication with the fluid port of the axle.

2. The lay-up forming device of claim 1, further comprising a fluid line coupled to the axle of the one or more conformable rollers through the roller assembly.

3. The lay-up forming device of claim 1, wherein the at least one support comprises a rigid material.

4. The lay-up forming device of claim 1, wherein the flexible outer wall comprises an elastomer.

5. The lay-up forming device of claim 1, wherein a location of the at least one support corresponds with a substantially flat contact region of the one or more conformable rollers.

6. The lay-up forming device of claim 1, wherein a location of the at least one fluid cavity corresponds to a geometry transition region of the one or more conformable rollers.

7. The lay-up forming device of claim 1, wherein the at least one support includes a seal configured to prevent a fluid from leaving the at least one fluid cavity.

8. The lay-up forming device of claim 1, wherein the at least one support includes a stiffener positioned within the at least one fluid cavity.

9. The lay-up forming device of claim 8, wherein the stiffener includes one or more apertures configured to facilitate fluid communication through the stiffener within the at least one fluid cavity.

10. A lay-up forming element comprising:
    an inner region extending through the lay-up forming element from a first end of the lay-up forming element to a second opposite end of the lay-up forming element, the inner region including a fluid port;
    a flexible outer wall;
    a support extending between the inner region and the flexible outer wall, the support positioned along the inner region at a position between the first end of the lay-up forming element and the second end of the lay-up forming element; and
    a fluid cavity extending between the inner region and the flexible outer wall, the fluid cavity in fluid communication with the fluid port of the inner region.

11. The lay-up forming element of claim 10, wherein the support includes one or more ribs.

12. The lay-up forming element of claim 11, wherein the flexible outer wall includes one or more complementary ribs that form an interface with the one or more ribs of the support.

13. The lay-up forming element of claim 12, wherein the interface between the one or more ribs of the support and the one or more complementary ribs are configured to form a fluid tight seal.

14. The lay-up forming element of claim 10, wherein the support is configured to secure the flexible outer wall in an axial direction.

15. The lay-up forming element of claim 10, wherein the support is configured to secure the flexible outer wall in a radial direction.

16. The lay-up forming element of claim 10, wherein the inner region includes a mounting structure.

17. A method of forming a composite structure, the method comprising:
    applying a first sheet of material over a mold;
    applying a first compressing force to the first sheet of material through a forming element including a support portion and a flexible portion including a flexible outer wall defining a fluid cavity, wherein the support portion extends through the fluid cavity between the flexible outer wall and an inner structure, the support portion positioned between a first end and a second opposite end of the forming element;
    achieving pressure by applying a fluid pressure to the fluid cavity of the forming element through a fluid port, the fluid pressure in the fluid cavity applying pressure internally to the flexible portion of the forming element;
    applying a second sheet of material over the first sheet of material;
    applying a second compressing force to the second sheet of material through the forming element;
    conforming a shape of the flexible portion of the forming element to changing geometry created by added sheets of material on a radius feature of the mold.

18. The method of claim 17, wherein applying the fluid pressure comprises heating a fluid and applying the fluid pressure with the fluid after heating the fluid.

19. The method of claim 17, wherein applying the fluid pressure comprises cooling a fluid and applying the fluid pressure with the fluid after cooling the fluid.

\* \* \* \* \*